(12) United States Patent
Mukherjee et al.

(10) Patent No.: US 11,641,579 B1
(45) Date of Patent: May 2, 2023

(54) USER AGENTS, SYSTEMS AND METHODS FOR MACHINE-LEARNING AIDED AUTONOMOUS MOBILE NETWORK ACCESS

(71) Applicant: CABLE TELEVISION LABORATORIES, INC., Louisville, CO (US)

(72) Inventors: Sayandev Mukherjee, Santa Clara, CA (US); Bernardo Huberman, Palo Alto, CA (US); Thomas Sandholm, Mountain View, CA (US)

(73) Assignee: Cable Television Laboratories, Inc., Louisville, CO (US)

(*) Notice: Subject to any disclaimer, the term of this patent is extended or adjusted under 35 U.S.C. 154(b) by 7 days.

(21) Appl. No.: 17/192,539

(22) Filed: Mar. 4, 2021

Related U.S. Application Data

(60) Provisional application No. 63/122,718, filed on Dec. 8, 2020, provisional application No. 62/984,899, filed on Mar. 4, 2020.

(51) Int. Cl.
| | |
|---|---|
| *H04W 8/24* | (2009.01) |
| *H04W 72/08* | (2009.01) |
| *G06Q 30/08* | (2012.01) |
| *H04W 48/16* | (2009.01) |
| *H04W 48/18* | (2009.01) |

(52) U.S. Cl.
CPC .......... *H04W 8/245* (2013.01); *G06Q 30/08* (2013.01); *H04W 48/16* (2013.01); *H04W 48/18* (2013.01); *H04W 72/085* (2013.01)

(58) Field of Classification Search
CPC ..... H04W 8/245; H04W 72/08; H04W 48/16; H04W 48/18; H04W 72/085; G06Q 30/08
See application file for complete search history.

(56) References Cited

U.S. PATENT DOCUMENTS

2016/0232627 A1* 8/2016 Smith ............... G06F 16/29

OTHER PUBLICATIONS

Aleksandrs Slivkins, "Introduction to multi-armed bandits", Foundation and Trends in Machine Learning, arXiv:1904.07272, 1-188, (2019).
Amine et al., "New user association scheme based on multi-objective optimization for 5g ultra-dense multi-rat hetnets", IEEE International Conference on Communications (ICC), pp. 1-6, (2018).
B.A. Huberman and S. Asur, "BidPacket: Trading bandwidth in public spaces", Netnomics, vol. 17, pp. 223-232, (2016).

(Continued)

*Primary Examiner* — Diane D Mizrahi
(74) *Attorney, Agent, or Firm* — Elevated IP, LLC

(57) ABSTRACT

Agents, operating on user equipment, and related systems and methods for machine-learning aided autonomous control of mobile network access are disclosed. The agents, systems and methods allow for mobile network resources, which are pre-purchased or purchased in real-time, to be optimized according to a reward function that maximizes quality of experience as a function of price. Mobile network resources purchased in real-time may include spectrum bandwidth sold or auctioned in increments and purchased by UEs as needed.

11 Claims, 10 Drawing Sheets

(56) References Cited

OTHER PUBLICATIONS

Barrett et al., "Applying reinforcement learning towards automating resource allocation and application scalability in the cloud", Concurrency and Computation: Practice and Experience, 25:1656-1674, (2013).

Bojovic et al., "A supervised learning approach to cognitive access point selection", IEEE Globecom Workshops (GC Wkshps), pp. 1100-1105, (2011).

Duff, "Q-learning for bandit problems", Proceedings of the 12th International Conference on Machine Learning, pp. 209-217, San Francisco, CA, USA, Morgan Kaufmann Publishers inc., (1995).

F.B. Mismar et al., "A Framework for Automated Cellular Network Tuning with Reinforcement Learning", arXiv:1808.05140, pp. 1-32, (2019).

H. Zhang et al. "Reinforcement Learning-Based Interference Control for Ultra-Dense Small Cells", IEEE Global Communications Conference, pp. 1-6, (2018).

Haddar et al., "Supervised machine learning for service providers' classification using multiple criteria in a network architecture environment", Proceedings of the 12th International Conference on Intelligent Systems: Theories and Applications, pp. 1-7, (2018).

Keqin Liu and Qing Zhao, "Indexability of restless bandit problems and optimality of whittle index for dynamic multi-channel access", IEEE Transactions on Information Theory, 56(11): 5547-5567, (2010).

N. Naderializadeh et al., "When Multiple Agents Learn to Schedule: A Distributed Radio Resource Management Framework", arXiv:1906.08792, pp. 1-8, (2019).

R. Trestian et al., "Game theory-based network selection: Solutions and challenges", IEEE Communications surveys & tutorials, 14(4): 1212-1231, (2012).

S. Kang, "Low-Complexity Learning for Dynamic Spectrum Access in Multi-User Multi-Channel Networks", Master's Thesis, Ulsan National Institute of Science and Technology, pp. 1-40, (2018).

S. Mosleh et al., "Dynamic Spectrum Access with Reinforcement Learning for Unlicensed Access in 5G and Beyond", IEEE 91st Vehicular Technology Conference, pp. 1-7, (2020).

Salem et al., "Reputation-based Wi-Fi deployment", ACM SIGMOBILE Mobile Computing and Communications Review, 9(3): 69-81, (2005).

T. Sandholm and B.A. Huberman, "A learning approach to Wi-Fi access", arXiv:1811.09946, 1-12, (2018).

V. Mnih, A. Puigdomènech Badia, M. Mirza, A. Graves, T.P. Lillicrap, T. Harley, D. Silver, and K. Kavukcuoglu, "Asynchronous Methods for Deep Reinforcement Learning," arxiv.org/abs/1602.01783, 1-19, (2016).

Vamvakas et al., "Dynamic provider selection & power resource management in competitive wireless communication markets", Mobile Networks and Applications, 23(1): 86-99, (2018).

Wang et al., "Deep reinforcement learning for dynamic multichannel access in wireless networks", IEEE Transactions on Cognitive Communications and Networking, 4(2): 257-265, (2018).

X. Tan et al., "Cell selection in two-tier femtocell networks using Q-learning algorithm", 16th International Conference an Advanced Communication Technology, IEEE, pp. 1036-1040, (2014).

Y. Wei et al., "A reinforcement learning based auto-scaling approach for SaaS providers in dynamic cloud environment", Mathematical Problems in Engineering, pp. 1-12, (2019).

\* cited by examiner

USER AGENTS, SYSTEMS AND METHODS FOR MACHINE-LEARNING AIDED AUTONOMOUS MOBILE NETWORK ACCESS

CROSS-REFERENCE TO RELATED APPLICATIONS

This application claims the benefit of and priority to U.S. Provisional Patent Application Nos. 62/984,899, filed Mar. 4, 2020, and 63/122,718, filed Dec. 8, 2020, each of which is hereby incorporated by reference in its entirety.

STATEMENT REGARDING FEDERALLY SPONSORED RESEARCH

None.

BACKGROUND

Today mobile network provisioning and operation with bandwidth guarantees requires 1) a license to operate on a dedicated band frequency range, 2) permission to install radio transceivers in strategic locations and 3) infrastructure to connect the transceivers to a core network backhaul. Each of these requirements can be used to differentiate a service, but at the same time also serves as a roadblock for providing new services. The end-result is inefficient (both in terms of utilization, performance and cost) use of network resources, such as RF spectrum across different locations and time periods. The most common way to address these issues today is through peering and roaming agreements between primary operators or spectrum license holders, a.k.a. Mobile Network Operators (MNOs), and secondary providers, network resource lessees, a.k.a Mobile Virtual Network Operators (MVNOs). Traditionally, these arrangements were set up to improve coverage of a service. More recently, a new type of MVNO has emerged that allows operation on multiple MNOs' networks in a given location to improve performance as well as coverage, e.g. GoogleFi.

From an end-user perspective these new MVNOs operate similarly to services offered from a traditional MNO or MVNO. Contracts follow the traditional monthly or yearly agreements, and the user controls neither the network used at any given time nor the set of networks that can be selected from at any given time and location. More importantly, an aggregator-MVNO's (such as GoogleFi's) decision as to which network is best at a particular time and place is based on an aggregate utility over all its served users, and does not take the budget or willingness-to-pay preferences of any individual user into account given a task at hand.

With the introduction of eSIMs, end-users can pick and choose from a large number of competing network providers in any given location without having to physically visit a store or wait for a physical SIM card to be shipped. Providers of eSIMs typically offer shorter contracts with limited data volumes. Modern phones allow both a physical and eSIM to be installed side-by-side, and any number of eSIM profiles may be installed on the same device, albeit currently only a single one can be active at any given time. This setup is ideal for travelers or for devices that just need very limited connectivity over a short period of time. An eSIM profile may also be used to top off primary plans and avoid hitting bandwidth throttling thresholds.

Currently, end-users have to manually switch between SIMs and eSIMs to activate, although different profiles can be designated for phone calls and messaging and data for instance.

One could argue that simply switching to the provider with the best signal at any given time is sufficient, but apart from switching cost it could also be suboptimal because estimating future signal strength in a complex mobile network is non-trivial and the most recent signal measured is not necessarily the best predictor. Mobility also plays an important role as the Quality of Service (QoS) offered depends heavily on location, and therefore machine learning models have been deployed to improve performance in mobile networks by predicting the best base stations to serve a user given a mobility pattern. Different applications may have different networking needs, complicating the selection process further, and motivating work such as Radio Access Technology (RAT) selection based on price and capacity. Finally, the user may also impose constraints on the budget available for bandwidth purchases, both in the near-term (daily or weekly) and the longer-term (monthly).

SUMMARY

In this work we focus on data usage and allowing an agent on the device to determine which network provider (e.g. eSIM) to use at any given time and location to optimize both bandwidth delivered and cost incurred. Because the agent is deployed on the device, it has access to the device location and the task being performed (i.e. the bandwidth demand of the current app) in addition to the traditional network signal strength measures used to pick a provider. Furthermore, since the agent is local this privacy sensitive data never has to leave the device, and can be highly personalized to the behavior of the user over a long period of time. Instead of relying on QoS guarantees offered by service providers and outlined in fine-print in obscure legal contracts, the agent learns the Quality of Experience (QoE), here defined as bandwidth per unit price with potential upper and lower bounds, for each provider under different demand conditions by exploration. The exploration itself follows a learning approach to construct an optimal switching policy between providers given a certain state, activity and budget of the user. Results were verified both via simulation and with commercial smart phones on an experimental testbed.

In an embodiment, a user agent for autonomously controlling mobile network access may use a machine learning model to switch between mobile networks using pre-purchased resources. For example, a user agent may switch between two or more mobile network service profiles when a UE contains multiple SIM cards. As an example, the user agent may detect when a user of a UE opens an application to make a phone call, determine which SIM card (mobile network provider) has cheaper voice rates, avoids roaming charges, and/or has the most voice minutes available, and then switch the UE to the mobile network service provider that optimizes utilization of the UE's pre-purchased resources.

In an embodiment, a user agent for autonomously controlling mobile network access may switch between mobile networks using resources purchased in real-time based on a machine learning model that optimizes a reward function to achieve the best quality of experience (QoE) at the lowest price. For example, a user agent may repeatedly purchase blocks of spectrum bandwidth for designated periods of time (short intervals (e.g., minutes or hours)) that allow a UE to migrate between service providers based on location, availability, service quality, and price.

In an aspect, an agent for autonomously controlling mobile network access comprises an activity monitor and a selector both located on a user equipment (UE). The activity monitor identifies an application accessed by a user and the selector: (i) receives information from the activity monitor; (ii) determines resource requirements for running the application; (iii) identifies a plurality of resource packages; (iv) predicts which one of the plurality of resource packages meets the resource requirements and optimizes a reward function using a machine learning model trained on previously implemented resource packages and associated quality of experience (QoE) metrics; and (iv) instructs a component of the UE to implement the one resource package.

In general, each of the plurality of resource packages provides at least a mobile network service provider, a resource quantity, and a price. For example, the resource quantity may be selected from a bandwidth allocation, pre-purchased data minutes, pre-purchased voice minutes, and a data capacity limit. In an embodiment, each of the plurality of resource packages further provides one or more of an epoch, an expiration date (e.g., pre-paid minutes expiring), a geographic indicator, a roaming indicator, a frequency band indicator, and an air-interface indicator (e.g., LTE, 5G).

In an embodiment, resource requirements for running an application comprise one or more of a type of resource, a bandwidth requirement and a priority designation. For example, the type of resource may be data or voice.

In an embodiment, a user agent may identify a plurality of resource packages by monitoring RF broadcasting channels, querying a resource database on the UE, geo-searching a cloud or edge resource database, querying a nearby base station, or querying a bandwidth clearing house. For example, a clearing house may be a resource database listing available resource packages, an auction clearing house that matches bids and offers, or a third-party aggregator that purchases contracts in bulk from mobile network service providers and offers them to consumers (thereby creating a secondary market). In an embodiment, a clearing house arranges a spectrum bandwidth auction between mobile network providers and consumers. In an embodiment, the auction is a Vickrey auction or a proportional share auction. In an embodiment, an auction specifies clearing rules, maximum allocations, clearing time, and/or minimal price for an allocation of spectrum frequency band access in a time period with a given bandwidth. In an embodiment, a mobile network provider may discover the consumers as well as the price they are willing to pay for an allocation before making a commitment to sell bandwidth allocations. In an embodiment, bids from consumers can be mapped into a resource share (e.g. proportional share auctions) and result in an executed smart contract with a commitment from the provider to offer that share at the price bid. In an embodiment, sealed bids from consumers can be matched to the second highest bid price and result in an executed smart contract where the provider offers the bandwidth resource to the winning bidder for the second highest bid price (e.g. Vickrey auctions) and refunds the difference between the top and second highest bid. In an embodiment, consumers may discover bid price history of winning bids to determine what price to bid for a desired bandwidth share.

In an embodiment, a quality of experience (QoE) metric is at least partially or completely based on throughput, latency, dropped frames, upload rate, and/or SINR. In an embodiment, user input may also be factored into QoE. In an embodiment, a reward function optimizes a QoE metric as a function of price. In an embodiment, the reward function optimizes a throughput-to-price ratio, or a latency-to-price ratio, or a SINR-to-price ratio. It will be understood that optimizing the throughput-to-price ratio means maximizing the ratio, whereas optimizing the latency-to-price or SINR-to-price ratio means minimizing the ratio. The QoE metric may be pre-programmed or set by a user.

In general, a reward function will be optimized over a period of time, such as a day, a week, a month, or a year, such that a cumulative reward is optimized.

In an embodiment, a user agent implements a selected resource package by activating one of a plurality of mobile network service profiles on the UE or purchasing spectrum bandwidth. The mobile network service profiles may be software-based, stored on physical medium, or a combination thereof when there are two or more mobile network service profiles. For example, the plurality of mobile network service profiles may comprise one or more physical SIM cards, embedded subscriber identity modules (eSIMs), and/or embedded universal integrated circuit cards (eUICCs).

In an embodiment, a user agent further includes a user profile comprising user preferences gathered from human input and/or machine learning. The user profile may, for example, be generated by a machine learning model trained on user input and/or user behaviors.

In an aspect, a system for autonomously switching between mobile networks comprises a user agent comprising an activity monitor and a selector, a resource database showing available resource packages, and a mobile network service provider, where the agent, the resource database, and the mobile network service provider are in operable communication with each other. In an embodiment, a system may include a plurality of UEs/agents operating independently from one another to implement resource packages and change the state of the environment for all of the UEs/agents.

In an embodiment, a resource database is located on a UE. For example, when pre-purchased resources are available on the UE, the resource database will be located on the UE.

In an embodiment, a resource database is a remote database in operable communication with a UE. For example, a resource database may be a bandwidth spectrum listing, a bandwidth spectrum auction, or a bandwidth spectrum broadcast.

In an embodiment, a system for autonomously switching between mobile networks comprises a transaction facilitator. For example, a transaction facilitator may be a small set of actors (computers) participating in permissioned writing to a transparent, decentralized ledger for atomic transactions. In another example, a transaction facilitator may be a peer-to-peer, permissionless ledger. Such systems can be implemented using blockchain technology. In an embodiment, a transaction facilitator executes smart contracts involving automatic and transparent processing of independently verifiable commitments to grant bandwidth access over arbitrarily small time periods to dedicated consumers at different price points.

In an embodiment, a transaction facilitator implements a protocol to write bandwidth allocation commitments into a mutually agreed on currency exchange and bandwidth allocation atomically and independently verifiable distributed ledger hosted by untrusted parties. In an embodiment, a bandwidth allocation request transaction comprises a commitment to purchase a spectrum frequency grant at a given price in a given epoch time with a given bandwidth. In an embodiment, a bandwidth allocation ledger entry comprises a cryptographically signed agreement between a provider and consumer(s) to grant bandwidth access at a price in an epoch for a bandwidth and spectrum.

In an aspect, a method for automating bandwidth purchases by user agents on a spectrum market comprises providing an agent on a user equipment (UE), the agent configured to: receive a request for bandwidth from the UE; identify a plurality of resource packages comprising spectrum bandwidth available for purchase; predict which one resource package of the plurality of resource packages optimizes a reward function using a machine learning model trained on previously implemented resource packages and associated quality of experience (QoE) metrics; and purchase the one resource package.

In an aspect, a method for automating bandwidth purchases by user agents on a spectrum market comprises providing an agent on a user equipment (UE), the agent configured to: receive a request for bandwidth from the UE; identify a plurality of resource packages comprising spectrum bandwidth available for purchase; purchase one of the plurality of resource packages; compute a quality of experience (QoE) metric resulting from the purchase of the resource package; create a data history comprising previously purchased resource packages and resulting QoE metrics; and use a machine learning model trained on the data history to predict which of a subsequent plurality of resource packages will optimize a reward function.

In an embodiment, a request for bandwidth occurs when a user of a UE accesses an application requiring spectrum bandwidth. In an embodiment, an agent identifies spectrum bandwidth available for purchase by monitoring RF broadcasting channels, geo-searching a cloud or edge database, querying a nearby base station, or querying a bandwidth clearing house. In an embodiment, the agent purchases the resource package through an atomic transaction.

In an embodiment, the agent is further configured to create a user profile comprising user preferences; assign a priority level to the request for bandwidth based on the user profile; and optimize the reward function based on the user profile.

In an aspect, a non-transitory computer-readable medium has a plurality of non-transitory instructions executable with a processor of a user equipment (UE) for automating bandwidth purchases, the plurality of non-transitory instructions being executable for: receiving a request for bandwidth from the UE; identifying a plurality of resource packages comprising spectrum bandwidth available for purchase; predicting which one resource package of the plurality of resource packages optimizes a reward function using a machine learning model trained on previously implemented resource packages and associated quality of experience (QoE) metrics; and purchasing the one resource package.

In an aspect, a non-transitory computer-readable medium has a plurality of non-transitory instructions executable with a processor of a user equipment (UE) for automating bandwidth purchases, the plurality of non-transitory instructions being executable for: receiving a request for bandwidth from the UE; identifying a plurality of resource packages comprising spectrum bandwidth available for purchase; purchasing one of the plurality of resource packages; computing a quality of experience (QoE) metric resulting from the purchase of the resource package; creating a data history comprising previously purchased resource packages and resulting QoE metrics; and using a machine learning model trained on the data history to predict which of a subsequent plurality of resource packages will optimize a cumulative QoE metric.

In an embodiment, the plurality of non-transitory instructions are further executable for updating the data history.

BRIEF DESCRIPTION OF THE DRAWINGS

Illustrative embodiments of the present invention are described in detail below with reference to the attached drawings.

DETAILED DESCRIPTION

Figure 1:
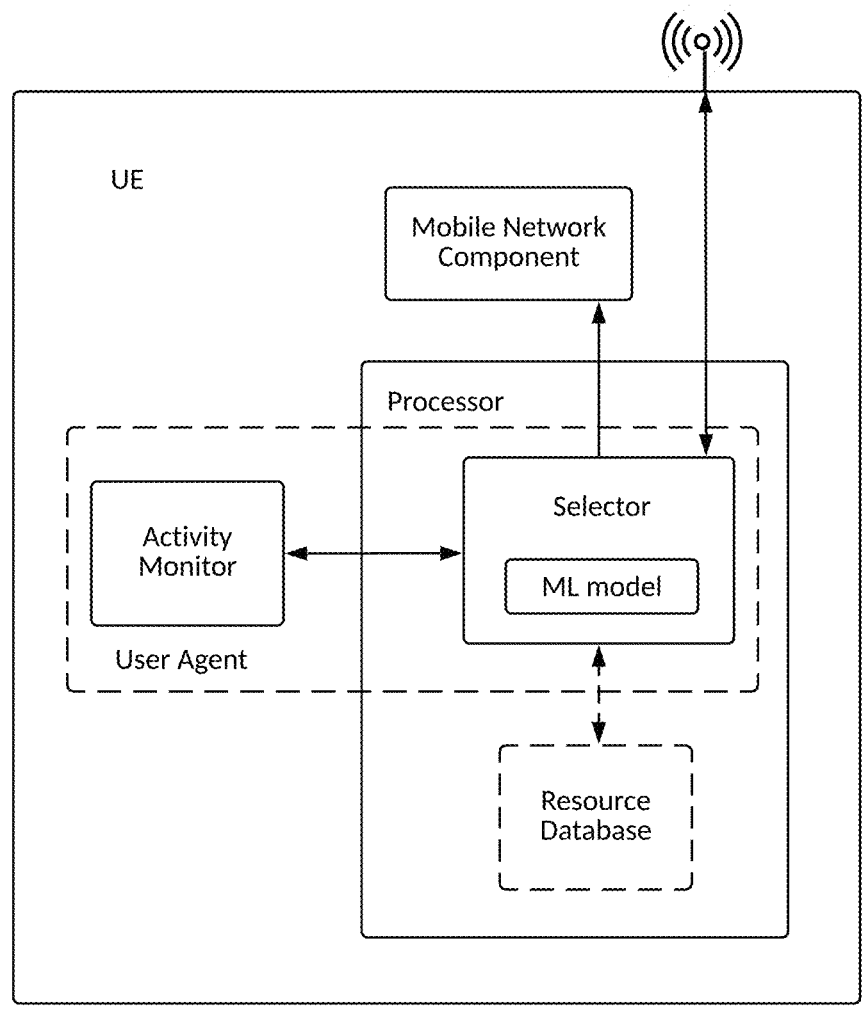
FIG. 1 is a block diagram of a user agent for autonomously controlling mobile network access, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, a "reward function" refers to a calculated metric representing quality of experience (QoE) as a function of price. An "optimized" reward function is the highest relative reward function value produced from a plurality of resource packages when a high QoE metric, or combination of QoE metrics, objectively produces the best mobile network experience (e.g., highest throughput, fastest upload or download rate, etc.). An "optimized" reward function is the lowest relative reward function value produced from a plurality of resource packages when a low QoE metric, or combination of metrics, objectively produces the best mobile network experience (e.g., lowest latency, fewest dropped frames, etc.).

FIG. 1 is a block diagram of a user agent for autonomously controlling access to mobile networks, according to an embodiment. The user agent resides on a user equipment (UE) and includes an activity monitor and a selector. The activity monitor identifies when a user selects an application requiring resources (e.g., voice or data) to run. The selector, which is in operable communication with the activity monitor, is notified that resources are required, and either the activity monitor or the selector determines the type and quantity of resources required to run the application. The selector is typically implemented as software executed by a processor of the UE and includes a machine learning (ML) model. The activity monitor may also be implemented as software executed on a processor of the UE, or the activity monitor may be a separate integrated circuit or switch. The selector queries a resource database, which may reside on the UE when resources are pre-purchased. Otherwise, the selector sends a signal, e.g., via an antenna of the UE, to a remote (e.g., cloud based) resource database to determine which resources packages meeting the resource requirements of the application are available. Then, the machine learning model of the selector predicts which resource package of those available will meet the resource requirements and optimize a reward function to achieve the best quality of experience at the lowest price. The selector then instructs a component of the UE to implement the selected resource package, e.g., by switching a mobile network component, such as a SIM card, or by sending a signal via the antenna to the remote resource database or a clearing house to purchase the selected resource package.

Figure 2:
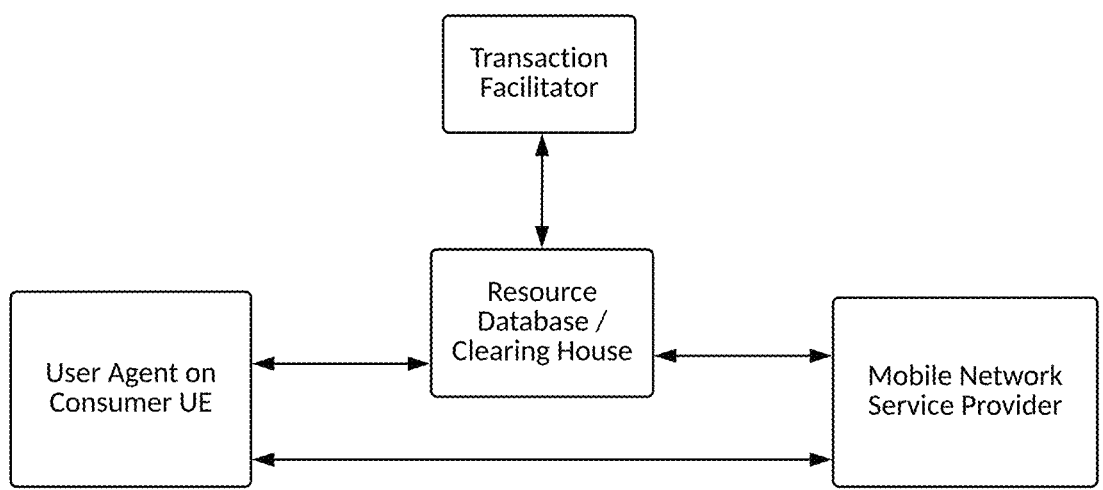
FIG. 2 is a block diagram illustrating a system architecture for autonomously controlling mobile network access, according to an embodiment.

FIG. 2 is a block diagram illustrating a system architecture for autonomously controlling mobile network access, according to an embodiment. The system comprises a user agent on a consumer UE, a resource database, and a mobile network service provider, each in operable communication with one another. In an embodiment, the mobile network service provider notifies the resource database of resource packages that it is willing to sell. The resource packages may, for example, specify resource quantity, price, location, epoch (time and duration), frequency band, and/or air-interface (e.g., LTE, 5G). Once the user agent is notified that a resource (e.g., bandwidth) is required by an application of the UE, it can query the resource database to determine which resource packages meeting the requirements of the application are available. The resource database, which may be an auction clearing house, will send a response to the user agent, which then selects the one resource package that will meet the application requirements and optimize a reward function. The user agent then notifies the resource database/clearing house of the selected package. The resource database/clearing house may then notify a transaction facilitator, which may be implemented within the resource database/clearing house, to record the transaction and provide a digital authorization for the purchase that is communicated to the consumer UE. The transaction facilitator may, for example, be a distributed, permissioned blockchain ledger recording atomic transactions. The consumer UE then communicates the digital authorization to the mobile network service provider to obtain access to the resource (e.g., spectrum bandwidth for a specified period).

Figure 3:
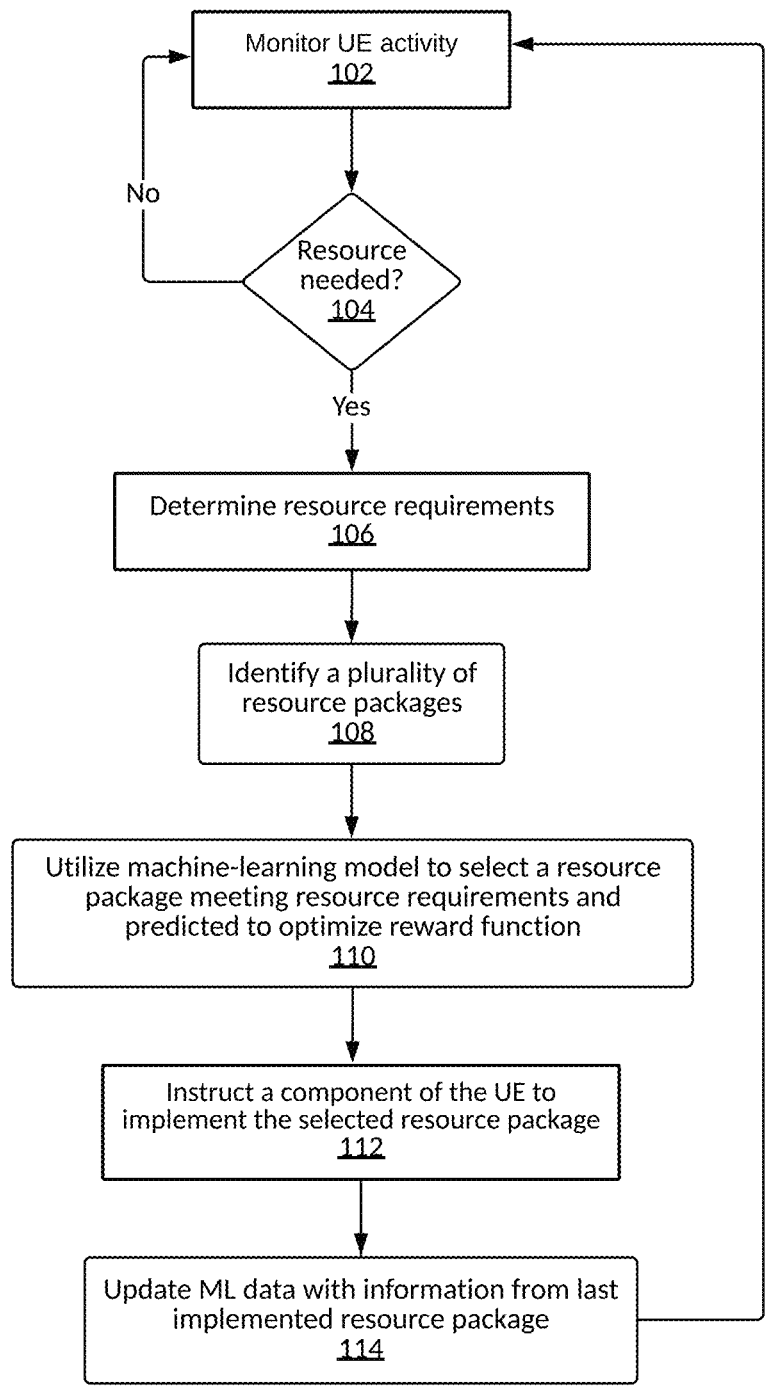
FIG. 3 is a flowchart illustrating steps in a method for autonomously controlling mobile network access, according to an embodiment.

FIG. 3 is a flowchart illustrating steps in a method for autonomously controlling mobile network access, according to an embodiment. In step 102, activity of the UE is monitored by the activity monitor of the user agent. Query 104 asks whether a resource is needed by an application of the UE. If the answer is "no", the method continues to monitor UE activity. If the answer to query 104 is "yes", the activity monitor or selector determines the resource requirements for running the application, in step 106. In step 108, the selector of the user agent identifies a plurality of resource packages that were pre-purchased or that are available for purchase. In step 110, the selector uses a machine learning model to select the resource package meeting the resource requirements and predicted to optimize a reward function that maximizes a quality of experience metric as a function of price. The selector instructs a component of the UE to implement the selected resource package in step 112 (e.g., by switching SIM cards or purchasing bandwidth), and then the ML data is updated with information from the last implemented resource package (e.g., resource package parameters and resulting QoE) in step 114. The process then repeats.

Markov Decision Processes (MDPs), Bandit Problems, and Reinforcement Learning

We show that the problem of how the user agent learns the best tradeoff between the exploration of different provider selection policies versus exploiting provider selections that have worked well in the past may be posed as a so-called Bandit problem. Bandit problems are a widely-studied class of Markov Decision Process (MDP) problems. If the dynamics of the interactions between the agent and the environment (the networks and other user agents), as represented by various probability distributions, are fully known, then the provider selection problem corresponds to a Bandit problem that can be solved exactly. However, this is seldom the case. A different discipline for attacking MDP problems when the probability distributions are unknown, called Reinforcement Learning (RL), can be applied to obtain solutions to these Bandit problems, often using an algorithm called Q-learning. We discuss and illustrate these approaches to the provider selection problem for a practically useful scenario.

Related Work

Optimal service provider selection has been investigated in several domains, such as Cloud computing, telecommunications, wireless infrastructure service providers, HetNets and WLANs. There is also a large body of work on provider focused centralized optimization of performance of users connected to one or many base stations using cognitive radio technology.

Cloud computing. In Barrett et al. "Applying reinforcement learning towards automating resource allocation and application scalability in the cloud." Concurrency and Computation: Practice and Experience, 25(12):1656-1674, 2013 and Wei et al. "A reinforcement learning based auto-scaling approach for SaaS providers in dynamic cloud environment." Mathematical Problems in Engineering, 2019, 2019 the authors address the problem of selecting an optimal Cloud infrastructure provider to run services on using Q-learning techniques. In Wei, the authors define an RL reward function where they consider the profit from offering the service as well as the idle time of virtual machines. They consider whether to purchase reserved instances or on-demand-instances with different pricing schemes with the goal of auto-scaling based on a stochastic load setting. The present work differs in multiple aspects beyond the application domain. We focus on throughput optimization, we assume a sunk cost for a time expiring capacity purchase and consider not only the workload but the QoS offered as well to be stochastic.

Telecommunications. The problem of selecting the best telecom service provider for VOIP service is investigated in Haddar et al. "Supervised machine learning for service providers' classification using multiple criteria in a network architecture environment." In Proceedings of the 12th International Conference on Intelligent Systems: Theories and Applications, pages 1-7,2018. Hader et al. take QoS, availability and price into account using a decision-tree model designed to predict classes of service levels most appropriate for users given their requirements. The method is a dynamic rule-based solution and hence relies on finding good delineating features, and having a large supervised training data set. In contrast, our approach can learn over time, and adjust more easily to non-stationary behavior. Our approach does require training, but not supervised or manual classification of samples. In Trestian et al. "Game theory-based network selection: Solutions and challenges." IEEE Communications surveys & tutorials, 14(4):1212-1231, 2012 a wide range of game-theoretical approaches to mobile network provider selection are surveyed, with the conclusion that computational complexity may hamper its adoption in practice. Moreover, claiming Pareto optimality may be difficult in a non-cooperative environment where the pricing mechanism is not centrally controlled.

Wireless infrastructure service providers. Vamvakas et al. "Dynamic provider selection & power resource management in competitive wireless communication markets." Mobile Networks and Applications, 23(1):86-99, 2018 considers mobile customer wireless service selection, albeit focusing on Wireless Internet Service Providers (WISPs) as opposed to eSIM providers. Their primary focus is on power allocation as opposed to bandwidth optimization. Moreover, they rely on global state to be communicated about each user and provider to find a global optimum (Nash Equilibrium). In contrast, our RL algorithm only needs local information and learns which providers to pick from experienced QoS. Vamvakas et al. propose a learning automata model that seeks to model switching probabilities instead of prescribing switch or stay actions, as in our approach. A reputation-based trust service and new security protocols were proposed to solve the problem of WISP selection in Salem et al. "Reputation-based Wi-Fi deployment." ACM SIGMOBILE Mobile Computing and Communications Review, 9(3):69-81, 2005. Adding a new trusted component to the network is, however, a steep hurdle to adoption. On the other hand, a poorly performing provider in our scenario would get less likely to be picked in the future due to deteriorating consumer-perceived rewards fed into the reward function in our approach.

HetNets. A wireless service provider may decide to serve an area by offering an LTE macro cell and a mix of individual smaller contained LTE pico cell base stations and Wi-Fi access points (APs), in what is typically referred to as a Heterogeneous Network or HetNet, for short. Each mobile station can then pick which base station (BS) as well as which technology to use based on bandwidth requirements, capacity available, and SINR. The problem of picking the best AP or BS for a user investigated in Amine et al. "New user association scheme based on multi-objective optimization for 5g ultra-dense multi-rat hetnets." In 2018 IEEE International Conference on Communications (ICC), pages 1-6. IEEE, 2018 is similar to the problem of network service provider selection, although Amine et al. generally assume that more information is available about competing users that can be used in centralized decisions. Amine et al. propose a genetic algorithm to solve a multi objective optimization problem and show that it does significantly better than methods simply based on maximizing the SINR. Our solution, on the other hand, is fully decentralized and applies an exploration-exploitation process to determine which provider offers the best QoS over time. Tan et al. "Cell selection in two-tier femtocell networks using Q-learning algorithm." In 16th International Conference on Advanced Communication Technology, pages 1031-1035. IEEE, 2014 propose a Q-learning algorithm to allow users to select optimal small cells to connect to without the need of a central controller. Their utility or reward function does not, however, take local conditions into account, such as the requirements of the currently running application. Furthermore, they don't consider price and thus not QoE, assume a single provider, use a Q-learning instead of bandit algorithm (we show below that the latter outperforms the former).

WLANs. In a Wireless Local Area Network (WLAN) context the problem can be defined as a mobile station selecting the best AP that is in signal range based on past experience. In Bojovic et al. "A supervised learning approach to cognitive access point selection." In 2011 IEEE GLOBECOM Workshops (GC Wkshps), pages 1100-1105.

IEEE, 2011, a multi-layer feed-forward neural network model is proposed to learn to predict the best provider for an STA given various WLAN parameters such as signal to noise ratio, failure probability, beacon delay, and detected interfering stations. In contrast to our approach, the neural network in Bojovic et al. is trained via a supervised learning model, relying on a large set of labeled training data. Moreover, it does not take cost into account and assumes all APs provide the same service given the detected signal inputs. In T.Sandholm and B.A. Huberman. "A learning approach to Wi-Fi access." arXiv preprint arXiv: 1811.09946, 2018, an approach to user association is proposed that learns the optimal user-to-AP mapping based on observed workloads. It differs from the approach presented in the present work at least in part because it relies on a central controller.

Cognitive Radio Networks. In addition to service provider selection, there has also been a lot of research into cognitive network operation and self-configuring APs or BSs to solve resource allocation problems centrally. Many of these algorithms are based on RL and Q-learning techniques. RL and related multi-armed bandwidth techniques have also been deployed to do link scheduling, determining whether to be silent or transmit in a time slot, across a distributed set of independent transmitters.

Dynamic channel selection. The general mathematical formulation of the dynamic channel selection problem as a Markov Decision Process yields a Restless Multiarmed Bandit Problem (RMBP). Unfortunately, there is no closed-form solution to this problem aside from special cases. Q-learning techniques have been proposed in theory and implemented via deep learning models, but the resulting model complexity, both in computation and storage requirements, is too large to be suitable for deployment as a user agent on a mobile device. For example, Wang et al. "Deep reinforcement learning for dynamic multichannel access in wireless networks." IEEE Transactions on Cognitive Communications and Networking, 4(2):257-265, 2018 use a very simple reward function and a sophisticated deep-learning approximation to compute the action-value function. Here, we use a more sophisticated reward function but a relatively simple action-value function that can be implemented as a table.

Motivation

Our hypothesis that there is an opportunity to optimize network selection that relies on different network providers offering different levels of QoS in different locations at different times in non-trivial ways. To measure QoS differences in different locations, we measured the performance of two tasks for two different mobile network providers in 40 locations across four neighboring cities.

The first task is a live video-conferencing session and represents a real-time interactive use case. The second task is a photo upload and represents a throughput bound batch use case. For the first task we measure frames decoded, frames dropped and connection time. For the second task we measure time to upload a photo to a Cloud server. For each location we also measure the signal strength with each network provider.

Table 1 summarizes the differences between sticking to a single provider versus dynamically picking the best provider across the metrics measured (for each task and location).

TABLE 1

Difference between best provider and fixed provider.
Improvement opportunity in bold.

| Metric | Provider | Difference (%) |
| --- | --- | --- |
| Decoded Frames | Ubigi | 5.33 |
|  | GigSky | 0.33 |
| Dropped Frames | Ubigi | −41.20 |
|  | GigSky | −57.68 |
| Connection Time | Ubigi | −10.54 |
|  | GigSky | −0.23 |
| Upload Time | Ubigi | −40.36 |
|  | GigSky | −26.60 |
| Signal Strength | Ubigi | 11.20 |
|  | GigSky | 20.87 |

The differences are measured as b−p/p where b is the measurement for the best provider and p is the measurement for the fixed provider. We also mark the improvement over the best fixed provider in bold as an indicator of the opportunity for picking the best provider in a location.

We note that the Dropped Frames, 41±%, from the video conference task and the Upload Time, 26+%, metric from the photo upload task show the greatest opportunities for improvement. The signal strength opportunity is also significant (11+%).

Now, to quantify the relationships between different metrics we compute the correlations between each metric and provider. The correlations could, for example, give a hint whether a higher frame drop rate could be explained by a poorer signal, or whether the location could give a hint has to which provider would have the best signal. To more explicitly measure the correlations to a specific location, we also compare the metrics for the current location with its nearest location.

It is interesting to note the low correlation between the same metric for one provider and the other. For instance getting a good signal with one provider does not mean you will get a good signal with the other. This again strengthens the hypothesis that selecting a different provider in a different location can lead to improvements. Furthermore, there are significant correlations between metrics in nearby locations, and thus there is an opportunity to predict metrics from observed metrics in the vicinity.

Experimental observations for the simple scenario described above show (a) that a strong signal from one provider may very well coexist with a weak signal from the other provider, and vice versa; and (b) the QoE metrics for a given provider are correlated across nearby locations. We conclude from (a) that there is potential value in a user being able to switch from one provider to another, but we also note that the inherent randomness in the wireless channel and environment means that the strength of the signal received from a selected provider may vary abruptly from instant to instant. Given the time and delay in switching from one provider to another, it follows that a user agent should make the decision to switch based on an aggregate measure (such as the mean) QoE on the two provider networks, rather than try to keep up with instantaneous changes on the two networks. Moreover, (b) suggests that such aggregate measures of QoE ought to be predictable for a selected provider network, based on past observations. Together, (a) and (b) therefore imply that a user agent can improve the user's QoE by judiciously switching between providers. We propose to support and enable such switching between providers through an online market for short-term leases of bandwidth to user agents from multiple network operators. The details of the implementation of such a spectrum market are described below. In the present section, we will define an idealized and abstract version of such a spectrum market. Doing so will allow us to formulate mathematically the provider selection problem.

Abstract Definition of a Spectrum Market

Our abstract definition of a spectrum market comprises the following:
A set of k providers, each of whom advertises a certain block of bandwidth to lease for an advertised duration at an advertised price, all advertised information being available online to all user agents;
A set of user agents, each of whom may lease an advertised offering from a provider for a specified time duration at a specified price;
A mechanism to process, authenticate, and transfer the payments from user agents to providers for leased bandwidth.

For our purposes at the present time, it is sufficient to restrict our attention to the set of providers, and consider the actions of a single user agent trying to select a provider at time t for the time duration beginning immediately and continuing until time t+1. Note that we are leaving the definitions of these time instants intentionally vague at this time for maximum generalizability later.

Terminology

An agent (on the user's device) interacts with the environment (the rest of the devices and all providers, across all bands available on the local spectrum market) via an action that takes the form of a purchase (strictly speaking, a lease) of bandwidth on a particular band from a particular provider for a specific duration of time.

Price setters and price takers. We assume that the only information that the agent can access regarding the environment is the advertised "sales catalog" of bandwidth offerings from the various providers, together with pricing information (which we will collectively call the environmental situation in what follows). This pricing information may be the actual prices per unit of bandwidth for each bandwidth offering as set by the appropriate provider. In this case, the agents are price takers. Note, however, that this does not mean that the price for a given bandwidth offering by a given provider is fixed and unchanging. On the contrary, the provider may implement congestion-based pricing (based on a proprietary algorithm that it does not disclose to other providers or to any user agent) that raises the price per unit of bandwidth if the number of users it is serving is high. In this case, the user agents indirectly influence the new prices through the congestion-pricing scheme used by the providers, but we still consider the agents to be price takers because they have no direct influence on the price.

However, the "pricing" information in the above environmental situation could also take the form of rules for a set of bandwidth auctions. This set of bandwidth auctions may be designed in many ways, ranging from one bandwidth auction per provider, with the commodity/commodities in a given auction being the bandwidth offering(s) from that provider, to a single auction for all bandwidth offerings from all providers. In the former auction arrangement, each provider only auctions off its spectrum amongst those agents who select this provider. In the latter auction arrangement, agents bid against each other for the joint bundle of a provider and its bandwidth offering. In either auction setup, the agents are price setters, because they directly influence the prices for bandwidth.

States and contexts. The environment may respond to the action of a given agent by changing its state, which may in turn change the environmental situation that is the only information about the changed environment that the user agent has access to. In this case, we call the environmental situation the state signal and view it as a representation of the state of the environment, where we restrict the use of the term state to properties or attributes of the environment that can be affected by the actions of an agent. On the other hand, if the information about the environment that is conveyed by the situation accessed by the agent is never modified by any agent action, then this situation is termed a context instead.

The Reward Hypothesis

Regardless of whether the environment changes state in response to an agent action, the environment always computes a scalar reward (the quality of service, or QoS, for the transmissions made or received by the agent over the bandwidth purchased by its action during the time period specified in its action). We model the goal of the user agent as that of selecting actions at each time step so as to maximize the cumulative (i.e., summed over multiple time steps) expected reward in the long run. This is called the Reward hypothesis. Since the cumulative discounted reward, being an aggregate QoS metric, is also a measure of the value or utility that the user gets for the actions of its agent, the Reward hypothesis also corresponds to the principle of Expected Utility maximization. The distinction between state and context is important when it comes to the kinds of algorithms that the agent may use to determine its actions to optimize its cumulative reward, as we shall see below. For brevity, the mathematical formulation of the provider selection problem that we shall give below is for states, as it is general enough to account for context as well.

MDP for a Single User Agent

At each time step t, the agent takes an action At drawn from a probability distribution (called a policy) that depends only on the present state St and not on the past history of states and/or actions taken to arrive at the present state. Moreover, given $S_t=s$ and action $A_t=a$, the environment changes its state to $S_{t+1}$ and computes a reward $R_{t+1}$ according to a joint conditional probability distribution on $(S_{t+1}, R_{t+1})$ which depends only on (s, a) and not the history of states and/or actions prior to time t. The above defines a Markov Decision Process (MDP). Note that the action may be a selection of a particular bandwidth offering from a particular provider, and may also include a bid price for that bandwidth offering if the latter is auctioned instead of sold for a fixed price. For the situations that we shall study in the following sections, the states will typically be either apps or pairs of apps and prices, for which it is reasonable to expect a lack of dependence of the above probability distributions on states and actions other than the most recent ones.

Provider Selection as a Bandit Problem

The provider selection problem for a single user agent is an RL problem (as per the Reward hypothesis above) wherein the user agent, without knowing the joint conditional probability distribution for the above MDP, has to find a policy that maximizes the expected value of the cumulative discounted reward $$\mathbb{E}\left[\sum_{u=0}^{\infty} \gamma^u R_{t+1+u} \,\bigg|\, S_1 = s_1\right]$$

starting from some state $s_1$ at time t=1, where 0<y<1 and y is a discount factor to ensure that the infinite-horizon cumulative discounted reward is finite if the rewards are bounded. For certain forms of the conditional probability distribution on $(S_{t+1}, R_{t+1})$ given $(S_t, A_t)$, some of which we will discuss below, this general RL problem turns out to be one of a class of well-studied problems called Bandit problems. When we only have context (which does not change in response to an agent's actions), the algorithms to determine such optimal actions are the topic of Associative Search, also called Contextual Bandits.

A Learning Approach

Recall that the agent has access to just the information in the state or context regarding the environment, and it receives a reward for each action it takes. The Reward hypothesis suggests that the way for the agent to maximize its cumulative reward is to learn from its interactions with the environment the actions to take when in a given state or context in order to maximize not necessarily the immediate reward but the long-term cumulative reward. Note, in particular, the flexibility and robustness of such a learning approach compared to a rule-based approach with a predefined rule or set of rules, which will always take the same action when faced with the same situation, and may not know how to react in response to a situation that is not covered by the rule.

Review of Multi-Armed Bandit Problems

Contextual k-Armed Bandit

We simplify the provider selection problem description by stipulating that as soon as the human user launches an app (for brevity, making a call will also be considered "launching an app" in what follows), the user agent instantaneously selects one of, say, k SIMs or eSIMs, and enables the selected SIM/eSIM if it was not enabled already.

The only action that the user agent takes is to select the SIM/eSIM (i.e., provider) to enable next. The context (not changeable by the agent's action) is the app that was launched by the human user. The reward that the agent receives for its action is the QoE corresponding to the context (i.e., app launched on the selected provider). Note that owing to randomness on the channel between the device and the base stations serving it, the reward is a random variable. In short, the agent is faced repeatedly with a choice of k different actions (each corresponding to the selection of a different network provider) at each time step. Each time step corresponds to a specific context (the app launched by the human user). Note that the time steps do not need to be uniformly spaced. Following the action, the agent receives a reward drawn from a probability distribution that depends on the context. If we view the choice of the k different actions as that of "pulling one of k levers," then the above is precisely the description of a contextual k-armed bandit.

The easiest way to approach a contextual k-armed bandit with, say, n values of the context (each corresponding to a different app launched by the user) is to simply apply a (non-contextual) k-armed bandit separately to each of the n contexts. In other words, we ignore all relationships between the different contexts and completely decouple the bandit problems between the different contexts. For the present scenario, this is equivalent to saying that we find, separately, the action selection rule to maximize the cumulative reward over all time steps when each particular app was launched. Thus, in the following analysis, we will discuss only the action selection rule for the (non-contextual) k—armed bandit problem corresponding to a specific app.

We start with some notation. Fix a specific app s∈{1, ..., n}, and assume this context is unchanged in what follows. Let the time steps be numbered 1, 2, .... Let the action taken by the agent at time t (i.e., the label of the selected provider) in context s be denoted $A_t(s) \in \{1, \ldots, k\}$. Then the simplest action selection rule is:

$$A_t(s) = \arg\max_a Q_{t(s,a)} \quad (1)$$

where for each a∈{1, ..., k} and t=1, 2, ..., the estimated action value function $Q_t(s, a)$ is defined by the arithmetic average of the rewards for action a∈{1, ..., k} up to and including time t−1:

$$Q_t(s, a) = \begin{cases} \frac{\sum_{i=1}^{t-1} R_{t} 1_{\{a\}}(A_t(s))}{N_{t-1}(s, a)} & N_{t-1}(s, a) > 0, \\ 0, & N_{t-1}(s, a) = 0, \end{cases} \quad (2)$$

is the number of times action a was selected by the agent up to and including time t−1 when the context is s, and for any set S, the indicator function $1_S(\cdot)$ is defined by $$1_S(x) = \begin{cases} 1, & \text{if } x \in S, \\ 0, & \text{otherwise} \end{cases}. \quad (3)$$

If the maximizing argument in (1) is not unique then $A_t(s)$ is chosen from amongst the maximizing arguments at random. In fact, to encourage exploration versus mere exploitation, we may select the action according to (1) (breaking ties randomly as described) with probability 1−ϵ for some small ϵ, say, while selecting a random action for $A_t(s)$ with probability ϵ.

Variations of the above selection rule may be defined, where the averaging in (2) is performed not over the entire history 1, 2, ..., t−1 but only the moving window of the last w values at time steps t−w, t−w+1, ..., t−1. Alternatively, (2) may be replaced by exponential averaging with exponential smoothing coefficient α∈(0, 1) over the values $R_i$ for i=1, ..., t−1 where $1_{\{a\}}(A_i(s)) = 1$.

Introducing State

Although it may appear that the launched app cannot be affected by the agent's action of provider selection and must therefore be part of the context rather than a state (recall that a state is one that can be changed by the agent's action), it is possible to redefine the above scenario to introduce a state into the problem formulation, as follows:

Suppose we have n apps, labeled 1, ..., n, and k providers. Define the k discrete-valued stochastic processes $\{S_t^{(i)}\}_{t=1}^{\infty}$, i=1, ..., k, where $S_t^{(i)} \in \{1, ..., n\}$, i=1, ..., k with the following dynamics: when the agent takes action $A_t = a \in \{1, ..., k\}$ at time step t, the stochastic process $S_t^{(i)}$ does not transition at this time step for any i≠a: $S_{t+1}^{(i)} = S_t^{(i)}$, whereas $S_t^{(\alpha)}$ makes a transition to $S_{t+1}^{(\alpha)}$ according to a Markov chain transition probability matrix $P^{(\alpha)} = [p_{s,s'}^{(\alpha)}]$ 1≤s,s'≤n, where for any s=1, ..., n and s'=1, ..., n, $$p_{s,s'}^{(a)} = \mathbb{P}\{S_{t+1}^{(a)} = s' | S_t^{(a)} = s\}, a \in \{1, ..., k\}.$$

In other words, we are now modeling the next app, i.e., the "next" value $S_{t+1}^{(\alpha)}$ for the selected provider $a \in \{1, ..., k\}$, as being launched just after the selection of the provider. This is in contrast to the modeling above, where we modeled the selection of the provider as occurring just after the launch of the next app. The new formulation also has the benefit of accounting for the dynamics of app transitions (i.e., the behavior of the human user) instead of decoupling all the apps and treating them separately from one another as we did before in the contextual k-armed bandit problem.

From the above description, it is clear that the vector stochastic process $\{S_t = (S_t^{(1)}, ..., S_t^{(k)})\}_{t=1}^{\infty}$ is a state of the environment (where the environment comprises the other users and all the providers), since it is changed by the user agent's action. Let $R_{t+1} = R_{(a)}(s)$ be the reward associated with the action $A_t = a \in \{1, ..., k\}$ and the launched app $S_{t+1}^{(\alpha)} = s \in \{1, ..., n\}$ on provider a.

Following the guidelines of RL, our goal is to identify a policy that at time step t, select action $A_t$ to maximize the expected value of the discounted cumulative reward $$G_t = \sum_{u=0}^{\infty} \gamma^u R_{t+1+u},$$

where $\gamma \in (0, 1)$ is a discount factor.

This new formulation of the provider selection problem does not have consistent nomenclature: it is most often simply called the k-armed bandit problem (omitting "contextual"). It is also sometimes called the Bayesian bandit problem and sometimes (somewhat misleadingly) even called the nonstationary Bandit problem. At the same time, the presence of states makes the problem amenable to attack by RL methods. We shall discuss both approaches to solving the problem below.

Direct RL approach via Q-learning. From the Bellman equations, the optimal action in state $S_t$ is given by $$A_t = \arg \max_a q*(S_t, a),$$

where the action-value function (or $n^k \times k$ table) q* (s, a) is defined as $$q*(s, a) = \mathbb{E}\left[R^{(a)}(S_{t+1}^{(a)}) + \gamma \max_{a'} q*(S_{t+1}, a') \mid S_t = s, A_t = a\right] \quad (4)$$

$$s \in \{1, ..., n\}^k, a \in \{1, ..., k\}.$$

We could perform the same kind of sampling and averaging for each state-action pair $S_t$, a) for each context-action pair, except that the averaging would be over the discounted cumulative rewards $G_t$ rather than the raw rewards $R_t$. This is an example of a Monte Carlo method. We choose not to employ RL Monte Carlo methods (in contrast to contextual bandit Monte Carlo methods, which we do employ), because the former require averaging over distinct episodes, where the sequence of states ends with a so-called terminal state representing an exit or end to a session. Such episodes are not clearly defined for our use case.

Instead, we use the 0-learning method to estimate q* (s, a) by iteratively updating at each time step as follows:

$$q*(s, a) \leftarrow q*(s, a) + \alpha[R_{t+1} + \gamma_{a'}^{max} q*(s', a') - q*(s, a)], \quad (5)$$

where s is the present state, s' and $R_{t+1}$ are respectively the next state caused by, and reward associated with, the agent action a in the state s, and $\alpha \in (0, 1)$ is an exponential smoothing coefficient.

Note that by the definition of the state vector, the transition from state s to s' under the action a only changes the $a^{th}$ entry of s' relative to s. Let s be the $a^{th}$ entry of s. Then the updates in (5) may be seen as applying to the n×k table $\overline{q}*(s, \alpha)$ instead of to q* (s, a), where $\overline{q}*(s, \alpha)$ is just the function q* (s, a) with all entries of s fixed except for the $a^{th}$ entry. Thus we need to maintain and update only an n×k table instead of an $n^k \times k$ table.

Exact and approximate (RL) approaches to the k-armed bandit problem. It is a remarkable result that if the transition probability matrices $P^{(a)}$ are known, and the expected reward $\mathbb{E}[R_{t+1}|S_{t+1}, S_t, A_t]$ is a deterministic function of $S_{t+1}$, then $$\mathbb{E}\left[\sum_{u=0}^{\infty} \gamma^u R_{t+1+u}\right]$$

can be maximized by a deterministic policy of the form $A_t(S_t) = \arg \max_{1 \le \alpha \le k} g_\alpha(S_t)$, where $g_a(\cdot)$ is called the Gittins index and can be computed from the known transition probability matrix $P^{(a)}$ by an iterative algorithm like the Varaiya-Walrand-Byukkoc algorithm.

Thus the optimal policy for the provider selection problem is available if we can compute the Gittins indices. However, this would require knowledge of the app transition probability matrices, which is unavailable to the agent.

Duff, "Q-learning for bandit problems." In Proceedings of the Twelfth International Conference on International Conference on Machine Learning, ICML'95, page 209-217, San Francisco, Calif., USA, 1995. Morgan Kaufmann Publishers Inc., proposed instead to apply Q-learning to approximate the calculation of the Gittins indices by updating not one but two new action-value functions (each an n×k×n table) at each training step, where one of these action-value functions is the Gittins index to be approximated, and the action at that training step is from the softmax distribution over this action-value function. Note that we maintain and update $2kn^2$ values over time, so the numerical complexity is higher than when we directly apply Q-learning (maintaining and updating only kn values over time) to maximize the discounted cumulative reward. Therefore we will not use this approach in the present disclosure. However, we mention it here for reference, as it can be applied to the provider selection problem in the general form of the spectrum market.

Quality of Experience

So far we have not given an expression or definition of a particular reward function for the two modeling scenarios discussed above. In either scenario, the action At of selecting a provider at time step t, immediately preceded or followed by launching an app $s \in \{1, \ldots, n\}$, associates the reward $R_{t+1}$ with this action. Before we can define the form of the reward $R_{t+1}$, we need to define the Quality of Experience (QoE) which is an important component of the reward.

We denote by $QoE_{t+1}^{(a)}(s)$ the QoE to the user on the selected provider a over the session that begins when the app is launched and ends when the app is closed or another app is launched, i.e., at time t+2. For example, $QoE_{t+1}^{(a)}(s)$ could be the throughput if s is a certain app, and could be latency if s is a different app. Note that the QoE is a random variable.

In order to be able to compare and accumulate rewards corresponding to different apps being launched, we assume that for each launched app s, $QoE_{t+1}^{(a)}(s) \in \{1, 2, \ldots, 10\}$ is the decile rank of the observed QoE relative to its own (i.e., same app, and same provider) probability distribution. The probability distribution is unknown, but is estimated from usage history.

An example of a reward function and its dependence on the QoE is given below.

Market With Fixed Prices and Equal Allocations

In this section, we formulate the provider selection problem for the scenario(s) that we shall then evaluate via simulation and experiment. At any time step, we will allow the providers to change the prices they charge for bandwidth, provided that these prices then stay fixed until the next time step. We also assume that the actions of the agents on the user devices in the network do not directly determine the prices charged by the providers, although they may indirectly determine these prices, as discussed above.

We will restrict ourselves to the scenario where at each time step t a user agent's action At is merely that of selecting a provider $a \in \{1, 2, \ldots, k\}$ to purchase bandwidth from at the present time step t, with this bandwidth to be used for transmissions over the next epoch, which is defined as the time interval starting just after time step t and ending at time step t+1. This represents the implementation of the spectrum market discussed herein, where the Blockchain used by the provider is set up to certify a certain number of user purchases for a block of bandwidth during a specified interval. In other words, the provider's offerings on the spectrum market are advertised in the following way, say: "$5 for 20 MHz of bandwidth, will accept up to 3 contracts for the hour starting 10 am." For this example, the provider stands to collect $5 each from 1, 2, or 3 user agents, who may select this provider at any time between 10 am and 11 am. Moreover, the provider divides the available bandwidth evenly between all users who select this provider during this time period. If only one user agent selects this provider, it pays $5 to the provider and receives the entire 20 MHz; if, however, a few minutes later, a second user agent also selects this provider, it pays $5 to the provider, and now both user agents receive only 10 MHz each for the rest of the hour, and so on. In short, since no user agent knows how many other user agents have selected a given provider, the bandwidth that an agent will receive on selecting a given provider is unknown to the agent.

Contextual Multi-Armed Bandit

Recall that the prices charged by the providers to the agents for selecting these providers, and these prices cannot be changed by the agents' actions, although they may be changed by the providers from one time step to the next. Clearly, this allows us to consider the set of prices charged by all providers as part of the context. As before, the app launched at any time step is also part of the context. From the perspective of a given user agent, the context at time t may therefore be defined as the pair $(s_t, p_t)$, where st is the app launched at time step t and $p_t = (p_t^{(1)}, \ldots, p_t^{(k)})$ is the set of prices charged by the providers for connecting to their networks.

The above discussion makes it clear that we can apply the contextual multi-armed bandit algorithm from above. We will adopt the simple approach of decoupling the contexts as before and considering them as separate non-contextual multi-armed bandit problems. Thus the action selection rule is that of (1), where the estimated action value function is given by (2). We call this action selection rule ExpectedUtility, noting that the expectation operation is not necessarily just the arithmetic mean as defined in (2), but may also be a moving average over a finite window, or exponential smoothing, as discussed above. Recall that the context space is now no longer just the launched app but the pair $(s_t, p_t)$ defined above. Thus, if there are k=2 providers, each randomly choosing one of m=2 prices to set at a given time step, then $p_t = (p_t^{(1)}, \ldots, p_t^{(k)})$ takes one of $k_m=4$ values. If the user launches one of n=2 apps, then st takes one of n=2 values, and then the context $(s_t, p_t)$ can take one of n $k^m=8$ values. The simple decoupling approach would indicate that for each value of the context, there needs to be a separate estimated action value function (2). However, we note that for a given agent action (provider selection) a at time step t, the only entry of $p_t$ that matters is $p_t^{(a)}$. It follows that we only need separate action value function estimates (2) for each of the n m values of the reduced context $(s_t, p_t^{(a)})$.

Q-Learning Solution

Just as we did earlier, it is possible to convert the context $(s_t, p_t)$ into a state $(s_t, p_t)$ that can be changed by the agents' actions just by modeling both the app-transitions and the pricing-transitions as transitions to different stochastic processes that occur immediately after the agent takes an action at a given time step. This also has the virtue of accounting for the dynamics of app transitions (i.e., human user behavior) as well as pricing transitions (i.e., provider behavior), instead of decoupling all values of $(s_t, p_t)$ from one another and treating them separately. Moreover, if the agent takes the action $A_t=a$ of selecting provider $a \in \{1, 2, \ldots, k\}$, as a result of which the state changes from $(s_t, p_t)$ to $(s_{t+1}, p_{t+1})$, the only components of the state that have actually changed are the $a^{th}$ entries of $s_t$ and $p_t$ respectively. In other words, we can work with the reduced state $(s_t^{(a)}, p_t^{(a)})$, which has only nm values. Thus, in the same way as described above, we can apply Q-learning by updating a reduced n m×k table $\overline{q}_*((s, p), \alpha)$ as per (5) at each time step. Also, this table can be augmented with probabilities $\pi_t ((s, p), a)$ calculated from (10) in order to perform action selection according to (13) as discussed above.

Finally, we note that although the Q-learning approximation to the Gittins Indices proposed in Duff and discussed above is also applicable here, we do not pursue it further for the same reason as above, namely the higher numerical complexity compared to direct Q-learning applied to maximize the cumulative discounted reward.

Reward Function

We define the reward as the "value for money" where the "value" is the QoE:

$$R_{t+1} = \frac{QoE_{t+1}^{(a)}(s)}{PlanPrice_t^{(a)}}, \quad (6)$$

and $PlanPrice_t^{(a)}$ is the price charged by the selected provider a to the user agent for joining this provider's network.

Simulation

The purpose of the simulations is to quantify the benefits of learning algorithms in a mobile network with dynamically-priced bandwidth contracts.

More specifically, we studied the effectiveness of mobile network provider selection based on experienced quality of service, called utility here. When a selection is made historical experiences as well as current costs are known. We also assume that each UE knows its own demand but not the demand of other UEs. Demand of other UEs need to be learned or inferred and cannot be directly obtained or queried.

One reason for this is that the network providers may not be willing to share this information, another is that it depends very much on the demand and preferences of a UE how it impacts other UEs.

The simulator computes the effective bandwidth and QoE for the UE using basic utility functions and SINR estimates based on positions of UEs, Base Stations and resource contention when multiple UEs connected to the same Base Station contend for spectrum resources.

Since the delivered performance is computed, it is more deterministic than with a real-world scenario where measurements may have non-negligible variance, so we also complement the simulations with experiment with real phones and networks below.

There are two types of UEs in the experiment: Background UEs that are simply placed in the simulation grid to inject contention, also referred to simply as UEs, and UEs that are allowed to make network selection decisions dynamically, and that we capture network performance from, referred to as Device under Test (DUT). We also simulate the complex problem of competing DUTS, or competing agents. It is easy to imagine algorithms where each agent makes the same decision and thus causes oscillation or lockstep behavior and load imbalance. We also hypothesize that varying demand across agents can be exploited to put them on different optimal providers and thereby yield a higher aggregate utility or QoE. This scenario also makes it clear that not only does a DUT not know the future demand of other DUTs, but it does not even know which provider the other DUTs will pick, thereby potentially causing contention impacting the DUT QoE.

Setup

We implemented a discrete even simulator based on the PyLTEs framework. PyLTEs was extended to add dynamic bandwidth pricing, UE resource contention, DUT network selection and competition, stochastic app demand, Base station position offsets across networks, a straight-path mobility model, and utility evaluation and recording.

Two competing networks are configured where one has a higher number of background UEs causing the maximum throughput delivered to be lower. The maximum throughput depends on the distance between the base station and the UE as well as the number of other UEs using the same base station. The network base stations are positioned with an offset and the DUTs start in the center and then move in a straight path away from the center at a random angle.

Recall the discussion above that the expected cumulative reward may be seen as a kind of utility for a given user agent. Our evaluation metric is aggregate utility, a.k.a. social welfare across all DUTs. Utility, being the expected cumulative reward, is computed based on the maximum throughput delivered and the demand of the currently running app on the DUT. Apps run with a transition probability to use the same app in the next step or switch to a new app. Each app has an associated utility function to compute the reward. A batch app simply computes the reward as the maximum throughput over price, and an interactive app sets a minimum throughput threshold that needs to be delivered to receive the full reward and caps the reward at that level. If that throughput is not met a lower bar reward slightly above 0 is delivered. For simplicity we specify that both app types are equally likely at any given time. Since both rewards are based on throughputs, we will for simplicity work with the throughput-to-price ratios themselves instead of converting them to their decile ranks as defined above.

The intuition is that a network selector that wants to optimize utility (i.e., expected cumulative reward) could select a lower cost, lower throughput network if the price is right.

Below we run simulations to investigate: optimal history length to estimate app utility, various combinations of fixed price and location, and competing DUTs.

The fixed location configuration ensures that the two networks always deliver a fixed max throughput throughout the simulation. The fixed price configuration similarly ensures that the networks do not change their prices within a run.

In the competing agent setup, multiple DUTs get to pick their preferred network in each step without knowing the decisions of other DUTs. DUTs train or calibrate at different times in this case to avoid lockstep behavior.

Each simulation is run in 200 steps (using the straightwalk mobility model described above). For each run or iteration we compute the social welfare for each benchmark. The costs and apps and positions are replayed for all benchmarks. We then iterate over the same procedure generating new app, cost and position traces 100 times and compute statistics with each iteration as an independent sample.

We set up 36 base stations per network in a grid with radius 1440 meters in a hexagonal layout with one network offset in both x and y coordinates from the other. In the fixed location case we set a step walk length to 1 meter ensuring that the signal from the networks does not change significantly to change the max throughput delivered from each network during the run. For the variable location setting the walk size is set to 20 meters for each step, which results in the networks delivering different throughput over time.

A summary of the general configuration parameters used across all simulations are shown in Table 2. Fixed location is achieved by setting walk length to 1, fixed pricing is enforced by setting max cost equal to min cost, and finally competing agents are achieved by setting DUTs to 3.

Note, app demand is individually and independently sampled on each DUT (in the competing agent case).

TABLE 2

Default Simulation Configuration.

General

| | |
|---|---|
| Steps | 200 |
| Training Steps | 30 |
| Iterations | 100 |
| Networks | 2 |
| Base Station Cell Layout | hexagonal |
| Cell Radius (m) | 1666 |
| Walk Length (per step, m) | 20 |
| DUTs | 1 |
| Mobilty Model | Straight path from center at random angle |

Network 1

| | |
|---|---|
| Base Station Power (dBm) | 30 |
| UEs | 72 |
| Base Stations | 36 |
| X, Y BS Grid Offset (units of radius) | 0.6, 0.4 |
| Min Cost ($) | 1 |
| Max Cost ($) | 2 |

Network 2

| | |
|---|---|
| Base Station Power (dBm) | 100 |
| UEs | 0 |
| Base Stations | 36 |
| X, Y BS Offset | 0, 0 |
| Min Cost ($) | 9 |
| Max Cost ($) | 10 |

App Demand

| | |
|---|---|
| App 1 Utility Function | Interactive |
| App 1 Threshold Demand (Mbps) | 12 |
| App 2 Utility Function | batch |
| Transition Probabilities App1→ App1, App1→ App2 | 0.5, 0.5 |
| Transition Probabilities App2→ App1, App2→ App2 | 0.5, 0.5 |

Provider selection policies evaluated via simulation

We evaluated the following provider selection policies:

(1) ExpectedUtility: As discussed above, this is the contextual k-armed (k=2) bandit optimal policy given by (1) with n=2 contexts (apps), where the function being maximized is given by (2).

(2) History: Same as ExpectedUtility, except that we define not n contexts (one per app) but only a single context. In other words, this is the original (non-contextual) k-armed bandit.

(3) RL: Recall that we have n=2 apps and k=2 providers in the simulation. Although each provider can set one of m=2 prices in the simulation, we simplify the state space for the Q-learning RL solution by using the smaller n×k (app, provider) action-value table instead of the n m×k ((app, price), provider) table. Specifically, we select the provider at time t according to $A_t = \arg\max_{\alpha \in \{1, \ldots, k\}} \bar{q}_*(S_t^\alpha)$, where for any $s \in \{1, 2\}$ and $a \in \{1, 2\}$, $$\bar{q}_*(s, a) \leftarrow \bar{q}_*(s, a) + \alpha\left[R_{t+1} + \gamma \max_{a'} \bar{q}_*(s', a') - \bar{q}_*(s, a)\right], \quad (7)$$

where α=0.2 and γ=0.7.

(4) LowestPrice: This is a baseline policy for comparison purposes, where at each time step we simply select the provider charging the lower price of the two providers.

(5) Random: This is another baseline policy that is evaluated purely to serve as a comparison against History, ExpectedUtility, and RL. Here, one of the two providers is selected by tossing a fair coin at each time step, independently from one step to the next.

History Parameter Tuning

We first investigate the optimal history length of recorded throughput values for apps to best estimate optimal utility on the two networks. Our parameter study compares the results of using as much history as available versus only keeping the 1-4 latest measurements. Pairwise t-tests were performed using 2-step rolling averages for each iteration (50 pairs total) with Bonferroni adjustments. The improvement of a benchmark against a baseline is simply computed as the difference over the baseline.

Based on the results in Table 3, the 2-period history outperforms the other parameters slightly and will therefore be used henceforth. As noted above, in a real-world experiment the optimal history lengths are likely to be longer and they also depend on the speed of travel, as well as the mobility model assumed. The point here is simply that this window averaging is effective in coping with mobility.

TABLE 3

History Parameter Tuning p-values and average improvements in t-test against unlimited history baseline.

| | p-value | Improvement |
|---|---|---|
| 1-Period | 0.03 | 0.033 |
| 2-Period | 0.008 | 0.037 |
| 3-Period | 0.03 | 0.033 |
| 4-Period | 0.08 | 0.030 |

Fixed Location, Fixed Price

The simplest possible scenario is when the DUT does not move outside of the cell and the max throughput environment does not change (fixed location) and the prices on the two networks do not change (fixed price). In this case the app demand is the only variable, and the only thing learned is the load on the networks and how well they meet the demand. The results summarized in Table 4 show that the ExpectedUtility model outperforms the other models significantly between 14 and 34% on average. Notably, the History benchmark does poorly in comparison due to not taking the App demand into account, i.e. not being aware of which app is causing what QoE.

TABLE 4

Fixed Location, Fixed Price p-values and average improvements of 2-period ExpectedUtility in t-test.

| | p-value | Improvement |
|---|---|---|
| History | $2 \times 10^{-16}$ | 0.19 |
| LowestPrice | $2 \times 10^{-16}$ | 0.14 |
| RL | $2 \times 10^{-16}$ | 0.23 |
| Random | $2 \times 10^{-16}$ | 0.34 |

Fixed Location, Variable Price

Next, we study the case where the price is no longer fixed, i.e. it could change over time even if the throughput doesn't change which provider is optimal for an app demand. In Table 5 we can see that History which also takes cost into account now performs a bit better, but still worse then ExpectedUtility. The standard RL model does worse compared to the fixed price scenario and so does the LowestPrice benchmark that simply picks the cheapest provider. The Random model scores slightly better in this scenario which could be interpreted as the load balancing across the different providers is more important when the price varies too. Overall the ExpectedUtility model performs similarly compared to the fixed price scenario and dominates all other models, showing that price is accounted for appropriately.

TABLE 5

Fixed Location, Variable Price p-values and average improvements of 2-period ExpectedUtility in t-test.

|  | p-value | Improvement |
|---|---|---|
| History | $2 \times 10^{-16}$ | 0.12 |
| LowestPrice | $2 \times 10^{-16}$ | 0.20 |
| RL | $2 \times 10^{-16}$ | 0.30 |
| Random | $2 \times 10^{-16}$ | 0.27 |

Variable Location, Fixed Price

Now, we vary location but fix the price over time. Most notably from Table 6 is that the Random allocation does very poorly with more than 40% worse aggregate utility compared to ExpectedUtility. This shows that price dynamics could easily make a random allocator not taking cost into account perform very poorly. Compared to the variable price case History also does a bit worse, which may be explained by the fact that it doesn't take location explicitly into account in terms of a window averaging mechanism like ExpectedUtility.

TABLE 6

Variable Location, Fixed Price p-values and average improvements of 2-period ExpectedUtility in t-test.

|  | p-value | Improvement |
|---|---|---|
| History | $1.5 \times 10^{-15}$ | 0.17 |
| LowestPrice | $1.2 \times 10^{-8}$ | 0.12 |
| RL | $2 \times 10^{-16}$ | 0.23 |
| Random | $2 \times 10^{-16}$ | 0.41 |

Variable Location, Variable Price

Next, we vary both location and price, and see that ExpectedUtility maintains its dominance over the other models in Table 7. Notably LowestPrice does poorly here, making the case that taking both price and mobility into account is important (in addition to demand).

TABLE 7

Variable Location, Variable Price p-values and average improvements of 2-period ExpectedUtility in t-test.

|  | p-value | Improvement |
|---|---|---|
| History | $3.8 \times 10^{-14}$ | 0.12 |
| LowestPrice | $2 \times 10^{-16}$ | 0.18 |
| RL | $2 \times 10^{-16}$ | 0.23 |
| Random | $2 \times 10^{-16}$ | 0.36 |

Competeing Agents

Finally, we vary both price, location and demand and also introduce two more competing DUTs, running the same provider selection algorithms, but with independent demands. Surprisingly, from Table 8 the standard RL does comparatively better although still worse than ExpectedUtility. The fact that the ExpectedUtility improvement over Random drops from about 40 to 20% could be explained by the fact that the decisions other DUTs are making could mislead the agent into thinking a network is worse than it is. It is still promising that the ExpectedUtility method does best even in this scenario.

TABLE 8

Competing Agents, p-values and average improvements of 2-period ExpectedUtility in t-test.

|  | p-value | Improvement |
|---|---|---|
| History | $5.9 \times 10^{-7}$ | 0.13 |
| LowestPrice | $6.1 \times 10^{-13}$ | 0.19 |
| RL | 0.0024 | 0.085 |
| Random | $1.6 \times 10^{-13}$ | 0.20 |

Summary of Simulation Results

We observe that in each of the simulated scenarios, the Monte Carlo algorithm for contextual multi-armed bandits, which we call ExpectedUtility, performs better than the direct Q-learning algorithm applied to maximize the expected cumulative discounted reward, which we have called RL above. Given the relative lack of sophistication of the Monte Carlo algorithm (1) compared to the RL Q-learning algorithm (7), these results may be surprising. However, they are explainable given that the simulated scenarios are exactly contextual multi-armed bandit problems, and the Monte Carlo algorithm is, in spite of its simplicity, a state-of-the-art solution to such problems, performing as well or better than many other algorithms including deep Q-learning (DQN). On the other hand, Q-learning is known to be hard to train with low training sample efficiency and has been bettered in performance by other contextual multi-armed bandit methods in the literature.

Implementation Notes

In this section we go into some more details on how the proposed system has been implemented. The current implementation relies on eSIM functionality and hence we start off with a quick primer on eSIM.

eSIM

Embedded Subscriber Identity Module (eSIM) or Embedded Universal Integrated Circuit Card (eUICC) is a programmable chip embedded in a device that allows it to connect to different mobile networks without a physical SIM card. The eSIM specifications are developed by the GSM Association (GSMA) and define the protocols and components required to remotely provision a software-based SIM card profile as part of subscribing to a mobile network service.

An eSIM profile is typically downloaded from a Subscription Manager-Data Preparation+(SM-DP+) server certified by the GSMA using a QR-code containing an activation code. The download process maps the identity of the device to a subscription provided by a mobile network operator. After the profile has been downloaded it may be activated, at which point the eSIM authenticates with and connects to a network with a matching public land mobile network (PLMN) identifier within reach, potentially after roaming to a supported provider. Typically only a single eSIM profile may be active at any given time, but any number of profiles may be downloaded and be in an inactive state on the device. After the eSIM is activated it behaves in the exact same way as a physical SIM card, until it is deactivated by switching to another profile or by deleting it from the device.

The time it takes to switch depends on the provider, and can be substantial if roaming is involved. The overhead beyond the authentication process (e.g. LTE Attach) is, however, negligible. The eSIM profile contains a hash of the mobile network provider certificate that allows mobile apps developed by that same provider to manage the eSIM profile in what is known as a carrier app. Providers have no access to profiles they did not provision (i.e. they cannot download or switch to profiles they do not own).

Hence, to switch between profiles those profiles could either be provided by an SMDP+ server you control or by the same provider that provisions the profiles though the SMDP+ server.

As an alternative to controlling a certified SMDP+ server, an app may also be promoted to a privileged system app, e.g. by the mobile OS or an OEM, to allow it to switch between multiple profiles. This is the approach we have taken in the implementation presented here.

The core piece of our implementation is the market where bandwidth contracts are sold and purchased, discussed next.

Blockchain Market

The key part of the system that allows autonomous purchasing of bandwidth contracts is a blockchain digital market where providers can set prices and UEs can purchase allocations. The blockchain is implemented as a ledger where bandwidth purchase transactions are recorded using smart contract processing. We used the open source Sawtooth Hyperledger implementation to implement a custom transaction processor to verify purchases, atomically execute bandwidth allocations and offers, and record account balances. A transaction processor takes a signed payload and then verifies it against the current state of the blockchain before adding a verified transaction to the ledger. We then allow the UE purchasing a contract to send proof of purchase to a network provider to get access, either by directly getting access to AKA parameters or in the eSIM case by simply enabling the pre-downloaded eSIM profile in the HSS. All services are implemented as REST endpoints offering a JSON API. We also implemented an exchange that allows for payment gateways to either withdraw or deposit real currency out of or into the bandwidth ledger. Each UE and each provider will have a unique account in the blockchain that in the UE case needs to be initiated with funds to start executing transactions.

The allocation and verification can also be done in a single step where the UE will prepare and sign a purchase request transaction and send that directly to the provider who will forward it to and execute it on the blockchain, before verifying the transaction and giving the UE access. This allows the UE to make allocations without being connected to or having direct access to the blockchain services.

The payloads are encoded as Protocol Buffer bytestreams using a standard Sawtooth format that allows for batches of transactions to be encoded and forwarded by third parties. The inner part of the payload is specific to the transaction processor that we defined. It can be encoded as json or as a simple comma separated string. Our custom payload is an action element that defines the intent of the transaction. It can be allocate, offer, deposit, or withdraw. Each of these payloads will also have a signer that requests the action and a target provider that the action is targeted at. The deposit and withdraw actions can only be performed by trusted exchanges to fund or exchange blockchain currency to and from other currencies. A UE would typically issue the allocate actions with a target provider that matches an offer on the blockchain. The blockchain records that are atomically written as a result of executed actions provide a cryptographically verified input payload and a state resulting from executing that payload. The state in this case provides the most up-to-date record of the balance of the target account, allocations remaining in an epoch (virtual time). This state together with the input payload that caused it to be recorded are available for anyone to verify that has access to the blockchain, i.e. the network bandwidth providers and payment gateway changes.

The payload is defined in Table 9. Note that not all payload elements are used or required by all actions. The ledger transaction record is defined in Table 10, and the basic processing rules for different actions are defined in Table 11.

TABLE 9

Blockchain Transaction Payload.

| | |
|---|---|
| provider action | Public key of target of action. Allocate, offer, withdraw, or deposit. |
| from_frequency | Lower inclusive bound of frequency in khz being served. |
| to_frequency | Upper inclusive bound of frequency in khz being served. |
| bandwidth | Band width within frequency band in khz being served. |
| epoch | Monotonically increasing integer defining the time period the allocation is valid. |
| price | Number of tokens required to purchase one allocation. |
| max_allocations | Max number of allocations that can be purchased with the specified bandwidth in the specified range. |

TABLE 10

Blockchain Transaction Record (State).

| | |
|---|---|
| provider | Public key of provider of offer. |
| from-freuqency | Lower inclusive bound of frequency in khz being served. |
| to_frequency | Upper inclusive bound of frequency in khz being served. |
| bandwidth | Band width within frequency band in khz being served. |
| epoch | Monotonically increasing integer defining the time period the allocation is valid. |
| price | Number of tokens required to purchase one allocation. |
| allocations_left | Number of allocations left that can be purchased. |
| account_balance | Balance of provider on blockchain. |

TABLE 11

Blockchain Transaction Processing Semantics for different Actions

| | |
|---|---|
| allocate | Checks that there is a matching offer in terms of provider, epoch and price and that there are allocations left to |

TABLE 11-continued

Blockchain Transaction Processing Semantics for different Actions

| | |
|---|---|
| | purchase, and that the signer of the payload has enough balance in his/her blockchain account. The price is deducted from the signer account and added to provider account on successful verification. |
| offer | Creates a new offer with a specified price, bandwidth and freuency band. |
| withdraw | If the provider already has an offer the epoch is incremented, otherwise it is set to 0. |
| deposit | A trusted exchange signer can request an amount to be withdrawn from an account. A trusted exchange signer can request an amount to be deposited into an account. |

Alternative Blockchain markets and auctions are discussed below.

LTE EPC Integration

To allow a network provider to sell bandwidth on our blockchain market they need to interact with the ledger to enable or provision users on demand and to update pricing and bands of offers. Different prices may be set on different frequency bands and for different band width. Each offer configuration has one price. The provider can also specify how many allocations within an offer can be sold within an epoch.

Users may purchase allocations independently of the provider and the provider would then validate proof of a transaction to grant the user an allocation and access to the network.

We have built two Proof of Concept integrations, and with the EPC/HSS of srsLTE, and one one with the Aricent EPC/HSS. The srsLTE integration allows both connected and disconnected allocations over a custom LTE protocol described below, and it provisions IMSIs and AKA keys on demand. The Aricent EPC/HSS integration enables and disables pre-provisioned and predownloaded eSIM profiles on demand.

srsLTE. The UE constructs a blockchain transaction by packing a bandwidth allocation transaction inside a ProtocolBuffer package. It is then sent over a custom NAS message (see below) to the srs HSS which will execute the transaction on the blockchain and if successful generate a new IMSI/AKA master key that is sent back to the UE. The UE will then make a standard NAS Attach call to authenticate.

Aricent. In the Aricent integration the users are pre-provisioned in the HSS based on allocated eSIM profiles. All IMSIs are set to disabled before any allocations are made. An integration service also has a mapping between the ICCID and IMSIs that are provisioned. When a phone with an eSIM profile wants to make an allocation they will like in the srsLTE case construct a ProtocolBuffer blockchain transaction locally and send it to the integration service to execute the transaction together with the ICCID of the profile that should be enabled. The mapping from ICCID to the correct integration server representing a network is done via discovery service where ICCID prefixes may be mapped to the correct provider to request the allocation based on a GPS geo-search. If the transaction executed successfully (price, epoch and provider match and the signer has enough funds) the IMSI corresponding to the provided ICCID will be enabled in the Aricent HSS using the Aricent REST API. The integration service also defines the actual lengths of an epoch. In our implementation an epoch is by default 5 minutes, which means that the phone may use the eSIM profiles for 5 minutes before they need to make a new purchase. In this case only connected allocations are supported, similarly to how eSIMs are provisioned. The connection that is used to make an allocation may be provided via Wi-Fi or may be an LTE connection that is active.

The integration service we implemented could be seen as a reference implementation of a network provider integration. To port it to a different network provider it simply needs to be extended to allow for calls to the EPC/HSS to enable and disable IMSIs on demand. All the UE and blockchain interactions can be reused.

Android eSIM Agent

Figure 4:
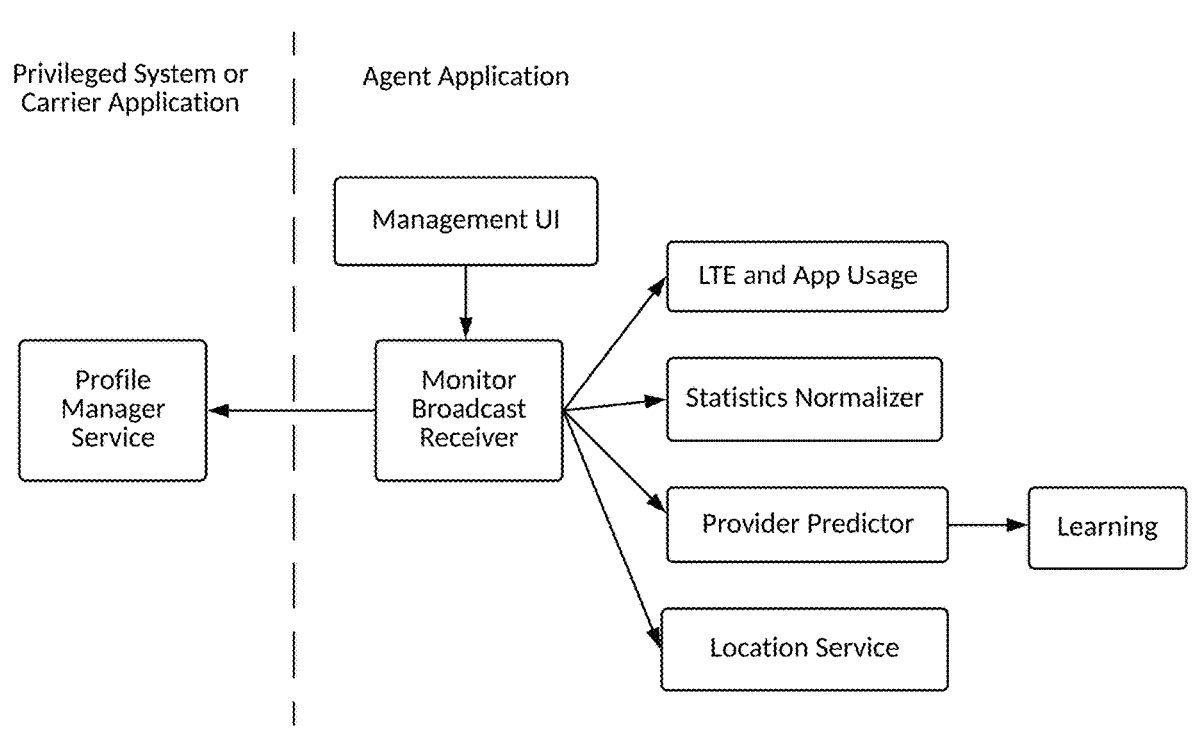
FIG. 4 is a high-level architecture of an Android implementation for a user agent described herein, according to an embodiment.

We have implemented the proposed method on the Android platform. It has been tested with Google Pixel 4 and 4a phones, but should work with any Android phone that supports eSIM. As alluded to above, one piece of the implementation runs as a privileged system app (or carrier app signed with the same certificate as the eSIM profile) to allow switching between eSIM profile providers. This piece has minimal functionality, whereas the bulk of the implementation of the agent is implemented as a regular app that could be installed from the app store. The privileged implementation can only be accessed by apps that are signed with the same certificate as the privileged app, mimicking the behavior of carrier apps. The high-level architecture of the Android app is depicted in FIG. 4.

The Profile Manager Service is the privileged system component (e.g., granted privileges using Magisk and systemize, or by matching eSIM certificate) that is responsible for interacting with the eUICC card, and more specifically instructs it to activate and deactivate downloaded profiles. It offers an API to external apps and services that have been signed with the same certificate. Service, in the context of the Profile Manager Service, refers to an Android Service that runs in the background and may be bound to by other services and applications following standard Android semantics.

The components on the Agent Application side of the architecture are all packaged into the same user-space app and may be deployed from a single apk package, e.g. from the Google Play Store. The Management UI component is the only piece that runs in the foreground and does not have to be running for the agent to perform its tasks. It allows users to configure the profiles that the agent should switch between, e.g. setting data cap and expiration rules, as well as to monitor and visualize the learned coverage maps and state transitions, resulting from the learning algorithm. This component can also pause and resume profile switching, and is responsible for starting the background task of the agent.

The Monitor Broadcast Receiver is the entry point for all background tasks. It is scheduled and wakes up at regular intervals, in our case once a minute regardless whether the UI part of the app is running. It is responsible for collecting state information and feeding it to the learning implementation in the form of a reward function. It calls the LTE and App Usage component to collect information about the current LTE signal quality and volume of data (in bytes) transmitted and received with the current LTE provider since the last period (minute), as well as the currently used (in the foreground) application. It also collects the current location through a foreground service called the Location Service. Based on these collected state parameters the Statistics Normalizer normalizes the values to simplify valid comparisons between providers. For example the throughput is normalized based on which application is running and the signal strength is averaged across location grid cells computed with the Geohash algorithm, which splits latitude and longitude coordinates in two planes and assigns bits depending on which side of the demarcation the location belongs, and then constructs a string of characters using an alphabet on a byte-by-byte basis. We use 5 character strings which roughly corresponds to cells of rectangular cells of 2×2 miles depending on where you are on earth. The throughput is normalized to determine whether a spike in throughput is due to the app or a better provider and the signal strength is normalized to avoid oscillation between provider when signal strength fluctuates rapidly, e.g. due to moving at high speed. Finally the normalized statistics are fed into the reward function, through the Provider Predictor component, which maintains historical state for learning. The Provider Predictor then predicts based on the learned state which provider should be picked next. At this point the Monitor Broadcast Receiver can make another check whether the user is actively using the phone (e.g. screen is on) to determine whether the switch should be enacted. If it should be enacted a call will be made to the Profile Manager service to switch. Note, if the switch is slow it will impact the traffic volume collected in the next period, which will impact the reward, and thus overhead in switching is baked into the predictions, to introduce natural inertia in switches.

LTE PBCH/NAS Extensions

To prototype allocations in a disconnected state we implemented a new LTE protocol using a USRP open source implementation called srsLTE. The implementation was tested with Ettus Research USRP B200 boards both on the UE and eNodeB side. To communicate bandwidth offers on the blockchain to the UEs in a disconnected state we made use of the PBCH and a new custom SIB. The SIB broadcast content is listed in Table 12.

TABLE 12

SIB Content.

| | |
|---|---|
| provider_public_key | Key used for account in blockchain offer. |
| from_frequency | Lower inclusive bound of frequency in khz being served. |
| to_frequency | Upper inclusive bound of frequency in khz being served. |
| bandwidth | Band width within frequency band in khz being served. |
| epoch | Monotonically increasing integer defining the time period the allocation is valid. |
| price | Number of tokens required to purchase one allocation. |
| max_allocations | Max number of allocations that can be purchased with the specified bandwidth in the specified range. |

To purchase an allocation two new NAS messages were defined RequestBandwithAllocation and BandwidthAllocationResponse shown in Tables 13 and 14.

TABLE 13

RequestBandwithAllocation NAS Message.

| | |
|---|---|
| batch | Base64 encoded UTF-8 of BatchList message with allocate transaction. |
| batch_id | Id of batch (batch header hash) used to check whether transaction completed. |
| timestamp | Epoch in seconds since 1970 to protect against replay attacks. |
| nonce | Random value to protect against replay attacks. |
| user | Public key of user matching signer of allocate transaction being verified and used to sign payload. |
| signature | Secp256k1 signature of proceeding fields with user key. |

TABLE 14

Bandwith Allocation Response NAS Message.

| | |
|---|---|
| verified | Whether verification succeeded. |
| key | Master key to be used with AKA on the UE. Will not be sent if verification failed. |
| imsi | IMSI matching MME/HSS PLMN and associated with the key to be used with AKA Attach requests on the UE. Will not be sent if verification failed. |
| timestamp | Epoch in seconds since 1970 to protect against replay attacks. |
| nonce | Random value to protect against replay attacks. |
| signature | Secp256k1 signature of proceeding fields with provider key. |

We modified both the srsLTE UE and EPC HSS implementation to send and receive the SIB and NAS messages as well as to install new credentials on demand based on successful transactions. The end-to-end transaction had an overhead of about 1 s. srsLTE was not designed for dynamic AKA credential provisioning so bringing up a new UE stack with a new IMSI configuration had an overhead of about 10 s.

Experiment

We designed an experiment testbed to verify simulation results with real LTE networks and real phones. The key difference to the simulations is that the UEs are not mobile, but app demand and price dynamics as well as competing agents are reproduced. Furthermore, utility values are not computed but measured based on real competing throughput and contention on the networks with natural variance. As a result training period impact also becomes more interesting to study. Another critical difference between the simulations and experiments is that the experiments actually purchase bandwidth contracts on the blockchain market whenever a network selection is made in each step. The allocation also results in the eSIM being enabled in the HSS for a limited time (a few minutes) enough to complete the step transmission.

Setup

We set up two independent LTE networks on different UL and DL central frequencies, and deployed three phones with eSIM profiles for both networks. The phones are stationary and receive perfect signal strength from both networks, however, one network offers lower bandwidth than the other. There is no other interference and no other users of the network than the three phones. Two Pixel4a phones and one Pixel4 phone made up the UEs in the experiments. All phones ran the Android 10 OS.

The setup configuration is summarized in Table 15. Note, the phones are co-located to the received power and signal from the two networks are the same for all phones. Likewise upload and download speeds are identical across all phones for the two networks.

TABLE 15

Testbed Network Configuration and Capacity.

| Network 1 | |
| --- | --- |
| EARFCN | 40620 |
| Bandwidth (Mhz) | 10 |
| Distance to UEs (ft) | 4 |
| RSRP (dBm) | −85 |
| Max Upload (Mbps) | 2 |
| Max Download (Mbps) | 32 |
| Network 2 | |
| EARFCN | 39750 |
| Bandwidth (Mhz) | 20 |
| Distance to UEs (ft) | 1 |
| RSRP (dBm) | −72 |
| Max Upload (Mbps) | 9 |
| Max Download (Mbps) | 84 |

Experiment Design

The three phones are connected via USB cables to a central controller PC in a LAN. The PC also runs iperf3 servers and an ADB bridge to control the phones. The phones have an iperf3 binary as well as eSIM profiles pre-downloaded for both networks. The phones also run a carrier app that allows programmatic switching between the eSIM profiles. The phones can discover the networks and their dynamic pricing via a discovery and bandwidth market we implemented (using blockchains, see implementation section). The phones simulate app demand by using different iperf3 bitrate limited TCP transmission or by using unlimited transmission. The task of a provider selector is to pick the best provider given current network prices and app demand. Historical throughput data may be collected and used to inform the selection in a training phase.

As with the simulations, app demand and price dynamics are configured similarly. Both networks alternate their offered price between high ($4) and low ($1) with 50% probability for each price.

We ran all base experiments for 30 steps with demand potentially changing for each step. The first 5 steps were used for training. In each step a 10 second upload is performed, and the throughput is measured. The throughput is then evaluated against the utility function of the current application. Like in the simulations we make use of batch and interactive apps, where interactive apps have a threshold that caps the utility. Apart from varying the number of UEs that dynamically pick a provider dynamically, we also vary the application demand to ensure there is an opportunity to pack the workloads efficiently across the networks. The demand configuration will be specified separately for each experiment below.

Results

Before running the provider selection experiments, we first study the contention between UEs with different traffic types across the networks, we then look at the performance of selection agents in scenarios where there is no competition between agents and increasing levels of competition.

Contention Experiment. In this experiment we compare the throughput performance of uploads and downloads (using iperf3), video streaming and Web page loading, as well as a workload with a mix of uploads and downloads. We compare the single UE performance to the performance with competing UEs (1 or 2).

From these experiments we can see that the video and web workloads do not fully stress the network capacity available and contention is reduced. Download has less contention than uploads because data are generated on a single PC for download and hence CPU contention masks network contention. The clearest contention results where performance degrades with 1/n where n is the number of competing UEs is uploads. Hence, we will utilize uploads in our experiments below.

Figure 5:
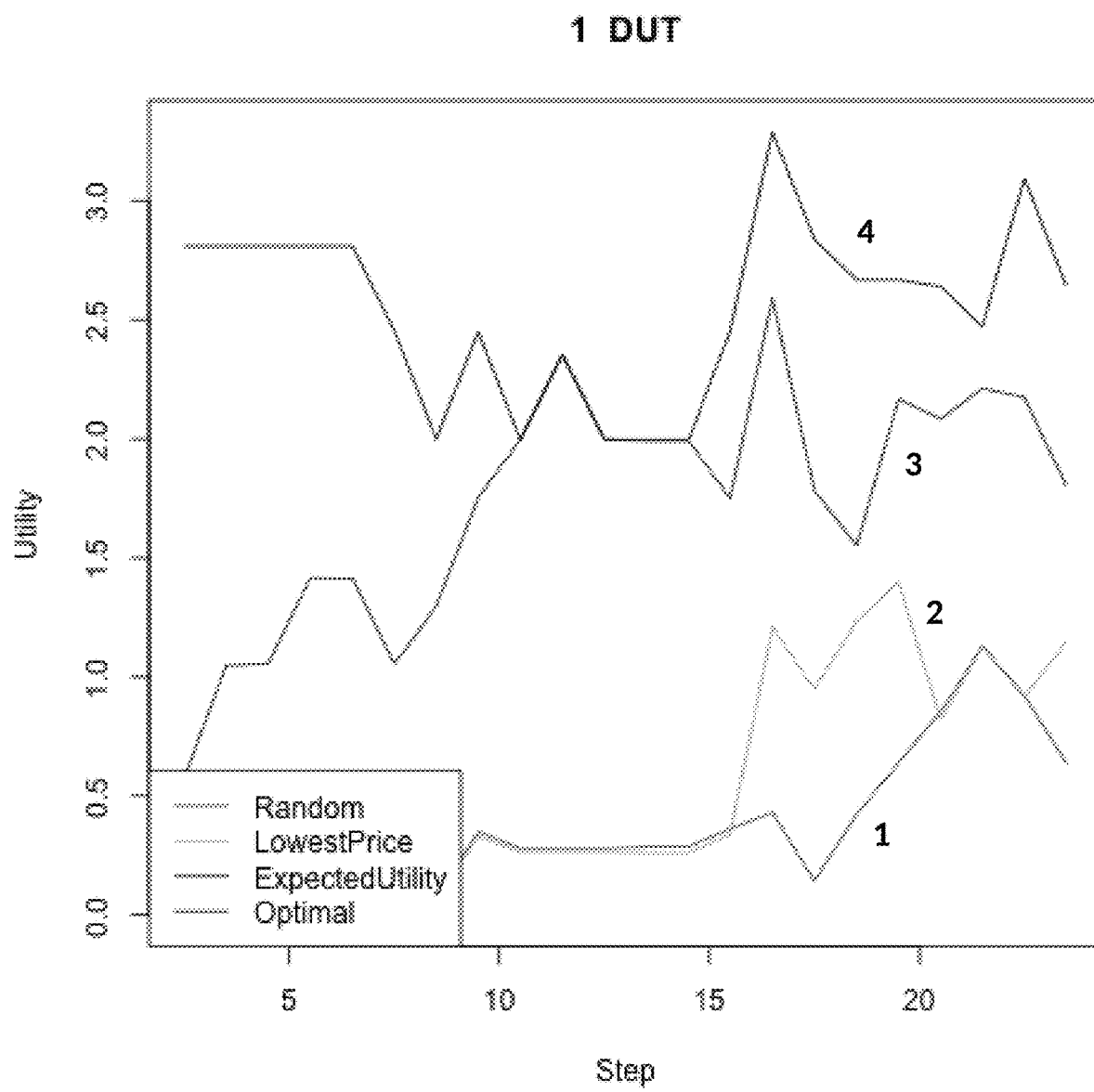
FIG. 5 is a graph illustrating results of experiments with 1 UE running a user agent disclosed herein and 2 UEs having fixed networks and loads.

Single UE Agent Experiment (1DUT). In the first experiment we let one UE select an optimal network to connect to given application demand and network prices, whereas two UEs are statically connected to one network each and run a unrestricted TCP upload. The demand varies randomly between a throughput limited upload and an unrestricted upload. FIG. 5 shows the results with 5 training steps and 25 prediction steps when the DUT selects a network randomly (line 1), based on lowest price (line 2), based on expected utility (line 3), and according to an optimized selection (line 4). Both price and demand may change in each step. Price varies between a premium price and a low price in a bi-modal distribution on both networks. Utility for the unrestricted demand application is simply throughput over price, and for the restricted demand there is a cap on throughput, beyond which utility does not increase and below which utility has a minimal fixed value. In this and subsequent experiments only the UEs that select their network dynamically are included in the aggregate utility metric. The other UEs simply serve as background load. The demand configuration for this experiment is shown in Table 16.

TABLE 16

Demand Configuration: Single UE Agent Experiment (1DUT).

| UE 1 | |
| --- | --- |
| Dynamic selection | yes |
| App 1 Utility Function | batch |
| App 2 Utility Function | Interactive |
| App 2 Threshold Demand (Mbps) | 2 |
| Transition Probabilties | |
| App1→ App1, App1→ App2 | 0.2, 0.8 |
| App2→ App1, App2→ App2 | 0.2, 0.8 |
| UE 2 | |
| Dynamic selection | no |
| Network | 1 |
| App Utility Function | batch |
| UE 3 | |
| Dynamic selection | no |
| Network | 2 |
| App Utility Function | batch |

Figure 6:
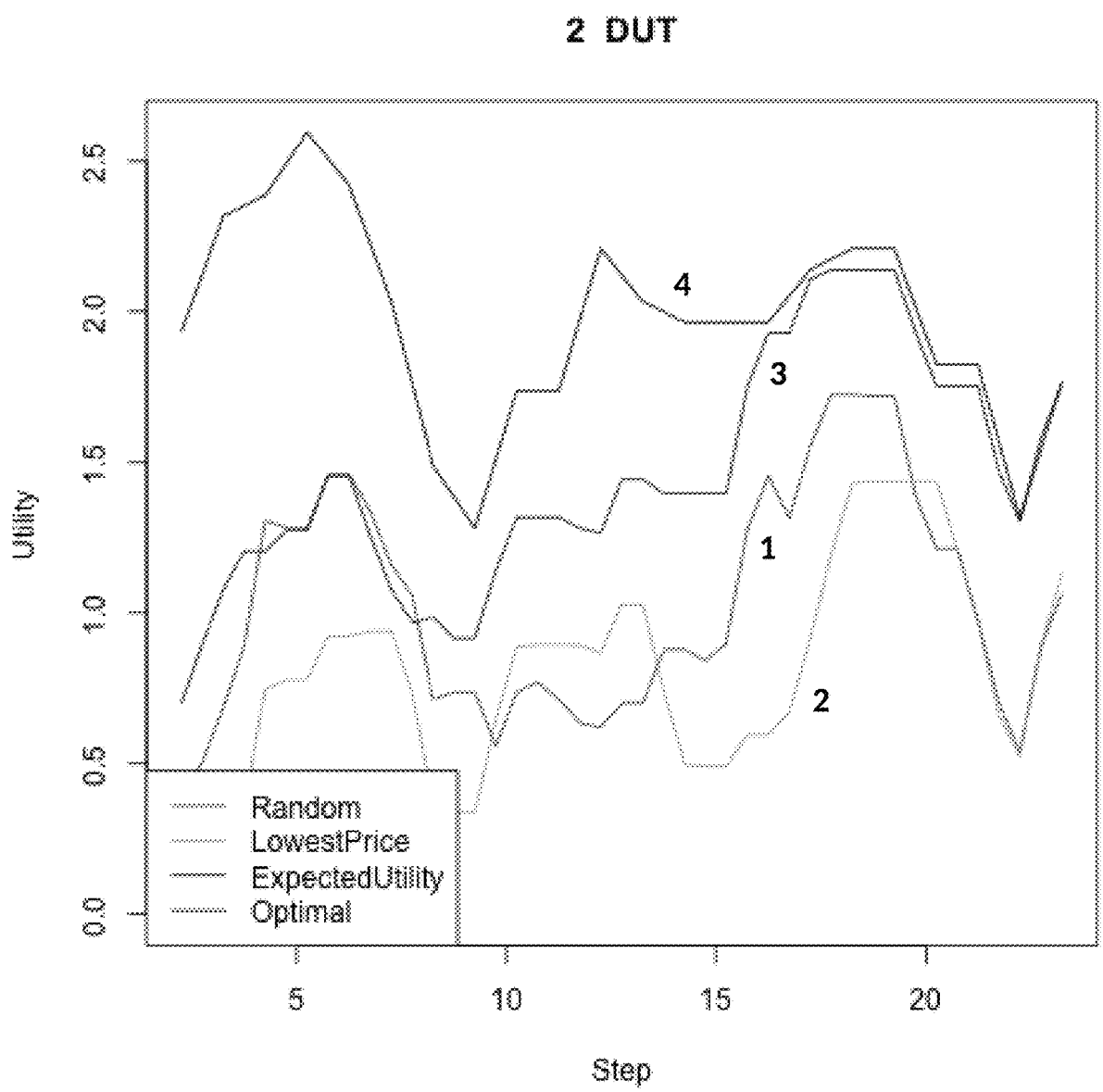
FIG. 6 is a graph illustrating results of experiments with 2 UEs running user agents disclosed herein and 1 UE having a fixed network and load.

Mixed UE Agents Experiment (2DUT). In this experiment we let two UEs select network providers in each step and only one UE is fixed. FIG. 6 shows the results when the DUTs select a network randomly (line 1), based on lowest price (line 2), based on expected utility (line 3), and according to an optimized selection (line 4). The demand configuration for this experiment is shown in Table 17.

TABLE 17

Demand Configuration: Mixed UE Agent Experiment (2DUT).

UE 1

| | |
|---|---|
| Dynamic selection | yes |
| App 1 Utility Function | batch |
| App 2 Utility Function | Interactive |
| App 2 Threshold Demand (Mbps) | 2 |
| Transition Probabilties | |
| App1→ App1, App1→ App2 | 0.8, 0.2 |
| App2→ App1, App2→ App2 | 0.8, 0.2 |

UE 2

| | |
|---|---|
| Dynamic selection | yes |
| App 1 Utility Function | batch |
| App 2 Utility Function | Interactive |
| App 2 Threshold Demand (Mbps) | 2 |
| Transition Probabilties | |
| App1→ App1, App1→ App2 | 0.2, 0.8 |
| App2→ App1, App2→ App2 | 0.2, 0.8 |

UE 3

| | |
|---|---|
| Dynamic selection | no |
| Network | 2 |
| App Utility Function | batch |

Figure 7:
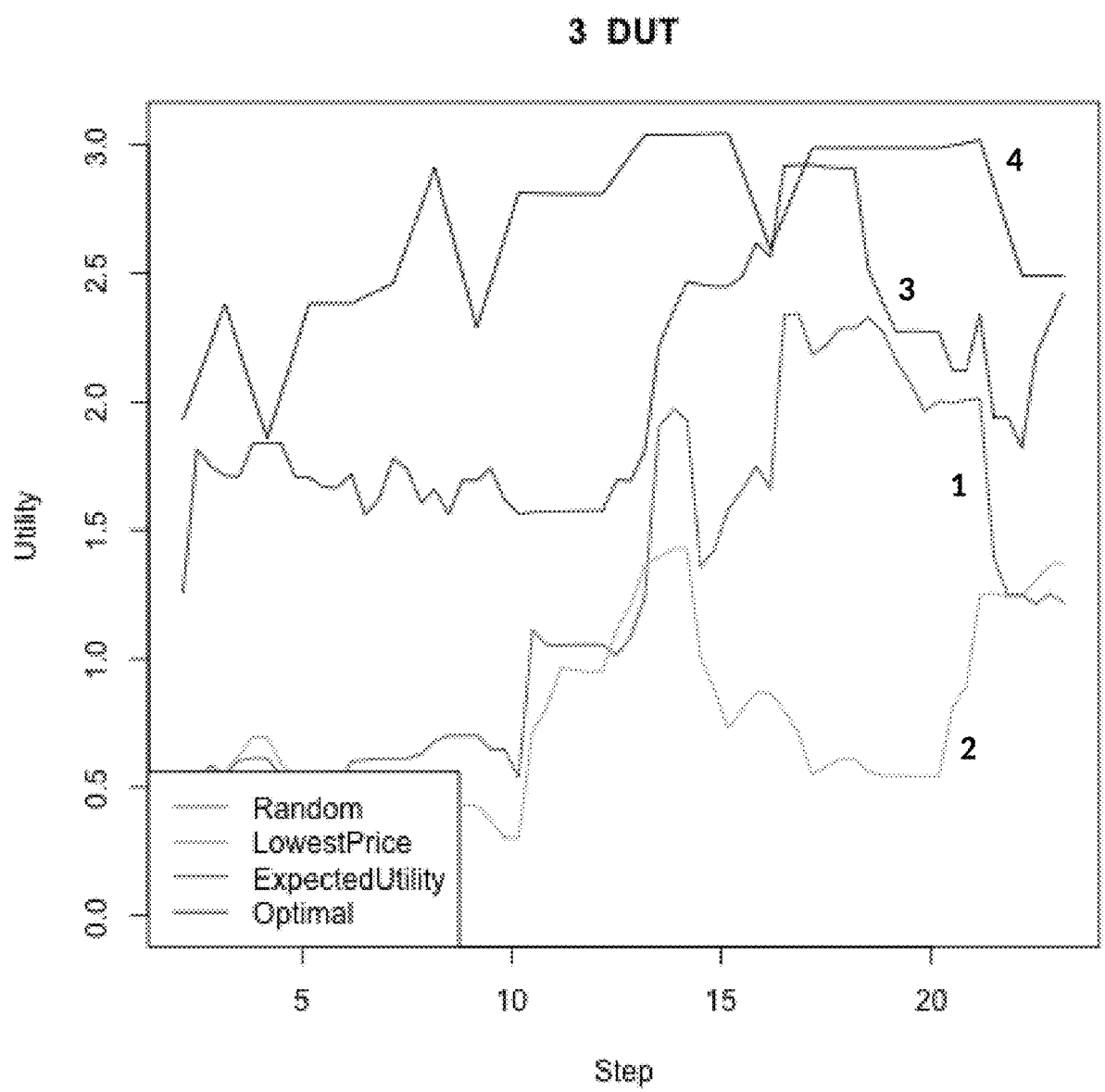
FIG. 7 is a graph illustrating results of experiments with 3 UEs running user agents disclosed herein.

Only UE Agents Experiment (3DUT). In this experiment we let all three UEs select network providers in each step. FIG. 7 shows the results when the DUTs select a network randomly (line 1), based on lowest price (line 2), based on expected utility (line 3), and according to an optimized selection (line 4).

From these experiment we can conclude that the ExpectedUtility method accounts for both price and demand to improve the utility or user experience both in single agent and competing agent scenarios. As expected simply picking the lowest priced provider does not work well when all agents do the same. The demand configuration for this experiment is shown in Table 18.

TABLE 18

Demand Configuration: Only UE Agent Experiment (3DUT).

UE 1

| | |
|---|---|
| Dynamic selection | yes |
| App 1 Utility Function | batch |
| App 2 Utility Function | Interactive |
| App 2 Threshold Demand (Mbps) | 2 |
| Transition Probabilties | |
| App1→ App1, App1→ App2 | 0.8, 0.2 |
| App2→ App1, App2→ App2 | 0.8, 0.2 |

UE 2

| | |
|---|---|
| Dynamic selection | yes |
| App Utility Function | batch |

UE 3

| | |
|---|---|
| Dynamic selection | yes |
| App 1 Utility Function | batch |
| App 2 Utility Function | Interactive |
| App 2 Threshold Demand (Mbps) | 2 |
| Transition Probabilties | |
| App1→ App1, App1→ App2 | 0.2, 0.8 |
| App2→ App1, App2→ App2 | 0.2, 0.8 |

Experiment Summary. Table 19 summarizes the results. Optimal values are computed by taking the optimal utility (from the best allocation) given demand and price of networks in each step across all experiment benchmarks. Similarly, selection adjusted values are computed by taking the optimal utility for the given allocation of a benchmark in each step.

TABLE 19

Improvement over random and p-values in t-test.

| | LowestPrice | | | ExpectedUtility | | |
|---|---|---|---|---|---|---|
| | 1DUT | 2DUT | 3DUT | 1DUT | 2DUT | 3DUT |
| Random Improvement | 0.28 | −0.19 | −0.33 | 2.8 | 0.41 | 0.71 |
| Selection Adjusted | −0.35 | −0.19 | −0.53 | 0.74 | 0.59 | 0.25 |
| Optimal Fraction | 0.21 | 0.42 | 0.29 | 0.64 | 0.73 | 0.76 |
| Selection Adjusted | 0.36 | 0.48 | 0.37 | 0.97 | 0.96 | 0.99 |
| Random t-test p-value | 1 | 0.02 | $3.5 \times 10^{-8}$ | $2 \times 10^{-16}$ | $1.5 \times 10^{-6}$ | $2 \times 10^{-16}$ |

Training Period Impact Experiment. Given that our approach is based on a learning technique, we now study the training period impact on the results. To limit the variable factors we fix both the prices and the application demand. As in the 2DUT experiment above we fix one UE on Network 2 and let 2 competing UEs run our agent and learning algorithm with different number of periods of training. None of the UEs knows the demand of the other UEs, but their QoE will vary depending on the network selection of the competing UE. To avoid lockstep allocations the training period allocations are random on both DUTs.

One UE runs an unlimited batch workload (UE1) and the other an interactive workload with a 1 Mbps threshold. The network offering lower bandwidth (Network 1) charges $1 and the one offering higher bandwidth (Network 2) charges $3 per allocation. Given that the prices are fixed, demands are fixed, and the network capacity is fixed we can easily tell theoretically what the optimal distribution of UEs on the network is, UE1 on Network 2, and UE2 on Network 1 (see below for more details), and compute allocation success rate.

We train the two UEs for different training periods and then measure the performance for the first step after the training period. We repeat the procedure 10 times and measure how many of these iterations have the optimal distribution of UEs over networks. Note that a random allocator is expected to provide a perfect allocation 25% of the time.

Even though we can tell the optimal allocation, the exact QoE delivered will vary depending on the exact throughput achieved at any given time, and is thus not fully deterministic, and again, none of the UEs know what demand the other UEs generate or even which networks they are connected to, and hence each UE needs to independently explore and learn the performance on the different networks, as well as the behavior of the competing UE and make their network selection accordingly. The experiment configuration is summarized in Table 20.

TABLE 20

Demand Configuration: Training Experiment.

UE 1

| | |
|---|---|
| Dynamic selection | yes |
| App Utility Function | batch |

TABLE 20-continued

Demand Configuration: Training Experiment.

| UE 2 | |
| --- | --- |
| Dynamic selection | yes |
| App Utility Function | interactive |
| App Threshold Demand (Mbps) | 1 |
| UE 3 | |
| Dynamic selection | no |
| Network | 2 |
| App Utility Function | interactive |
| App Threshold Demand (Mbps) | 6 |

By running all the possible distributions of UEs over the network we measured the expected performance for each UE to Network mapping possible. The results are shown in Table 21.

TABLE 21

Available Network Capacity (UE1, UE2).

| UEs | Network 1 | Network 2 |
| --- | --- | --- |
| 1 | (1-7, 1) | — |
| 2 | — | (4.5, 1) |
| 3 | (0.4, 1) | (3.8, 1) |

A batch agent (UE1) that samples long enough from this table will determine that the average throughput from Network 1 is 1.05 Mbps and from Network 2 4.15 Mbps with expected utilities 1.05 Mbps/$ and 1.38 Mbps/$ and will thus select Network 2. Similarly an interactive workload with threshold 1 Mbps will determine that the average throughput both from Network 1 and 2 is 1 Mbps and utilities 1 and 0.33 and thus will pick Network 1. Hence, the optimal allocation, as mentioned above, would be UE 1 on Network 2 and UE2 on Network 1.

Note, by design if UE1 samples from Network 1 when UE2 is not connected to it and from Network 2 when UE2 is connected to it, it will mistake Network 1 from being better, QoE 1.7 Mbps/$ versus 1.27 Mbps/$. That means that the agents need to learn not only which network is best but also take competing UEs into account.

Figure 8:
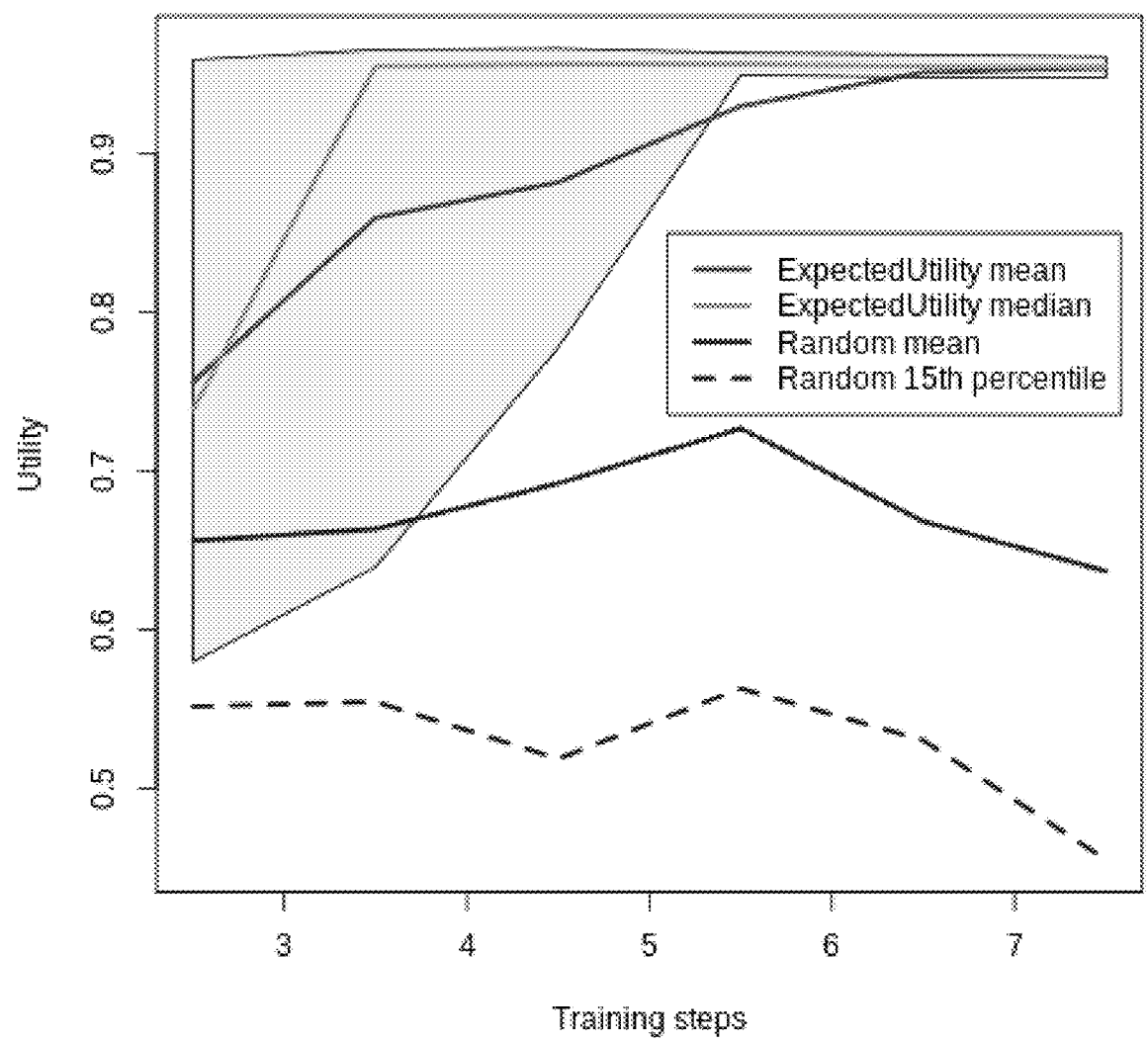
FIG. 8 is a graph illustrating results from training a machine-learning model for a user agent to maximize utility.

FIG. 8 shows the utility results for this experiment, where the shaded area depicts the 70% confidence band of QoE (utility) achieved. The values are smoothed with a two-period moving average. It is easy to see from Table 15 that the optimal utility is 1+1.5=2.5 Mbps/$, so the utility value in the graph is shown as the fraction of this optimal.

Figure 9:
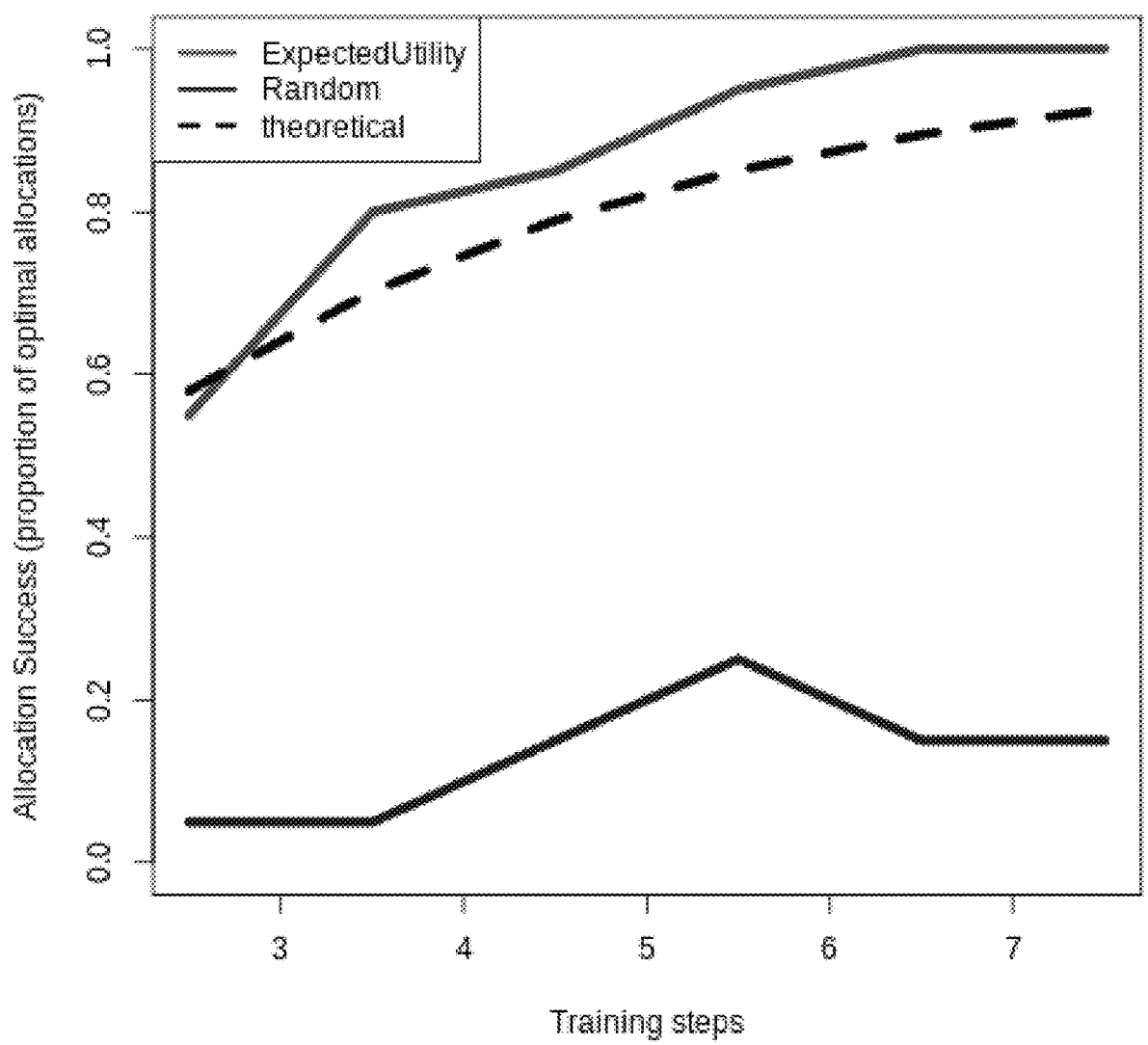
FIG. 9 is a graph illustrating allocation success rate improvement with increasing training steps.

FIG. 9 shows the allocation success rate improvement with increasing training steps. With only two training steps the result is comparable to the Random predictor as expected, as the predictor will make the wrong decision every time UE1 samples from Network 1 when UE2 is not connected to it. It can happen both in sample 1 and sample 2 with equal probability so about 25% of the time. These odds are the same as for the Random predictor, and hence no improvement is shown over Random in this case.

As the number of training samples increases there is less chance of biased sampling from Network 1, and the expected utility improves. Already with 3 samples there is a drastic improvement to about 80% correct allocations and an average utility fraction of about 85% compared to about 65% with Random. The worst allocations (bottom line of gray area denoting 15th percentile) steadily improves with ExpectedUtility, and the 70% confidence band shrinks and becomes minimal with 90% correct allocations. The theoretical allocation success depicted in FIG. 9 (again with two period smoothing) is computed as $1-(1/2)^{0.5\ s}$ where s denotes the number of samples in the training period. We perform better than this theoretical expectation for longer training periods due to some training periods being used for prediction. We do this to give the UEs a chance to learn what the preference is of the other UE. These results showcase that our method is capable of learning both network performance and competing user behavior with a small number of samples.

We should note here that the training samples needed are proportional to the number of distinct app demands modeled, in this case only one per UE. Hence the training steps needed for optimal allocations would be longer with more app demands, as you would need to sample each app on each UE for each combination of app to Network mapping of the other UE. Nevertheless, even if not fully optimal this mechanism can avoid repeated bad allocations. I.e. if a bad mapping is predicted it will be learned and not used again. Furthermore, simply assuming either a batch or an interactive demand could also simplify training.

Pre-Paid Providers on a Dual-SIM Device

We begin with a practical use case that is a special case of the contextual bandit problem. It is a common usage scenario in many countries for a single user to carry two pre-paid SIM cards (corresponding to two providers) in a single dual-SIM device, and manually enable a SIM (and associated voice and data plan) before making a call or launching an app. The reason for this may be that one provider's plan has a higher data cap than another, or has higher data rates than the other, or has more voice minutes included than the other.

The provider selection problem. Clearly, it is tedious for a human user to select and/or enable a SIM before making a call or launching an app. Let us design a user agent to perform this task automatically on behalf of the human user. The only action of the user agent is to select the SIM (i.e., provider) to enable next. The two providers have already been paid in advance (through the pre-paid SIM cards), and the selection/enabling of one provider's SIM over the other's does not make any difference to the environment (which here is just the networks of the two providers, and all other users on those two networks). Hence this is a contextual k-armed bandit problem with k=2. Moreover, the problem can be reformulated with states that can change as a result of the actions of the user agent, and hence direct RL approaches like Q-learning are also applicable.

Reward function(s). Before defining $R_{t+1}$, we establish the following notation: for any $a \in \{1, \ldots, k\}$, (1) $\text{DataUnused}_t^{(a)}$ are the unused parts of the data cap on the prepaid plans (as a fraction of their respective data caps);
(2) $\text{LifeRemaining}_t^{(a)}$ is the remaining life on the prepaid plans (in units of time steps);
(3) $\text{PlanPrice}_t^{(a)}$ is the cost of the prepaid plans (per time step). We now define $R_{t+1}$ as follows:

$$R_{t+1} = \frac{QoE_{t+1}^{(a)}(s)}{PlanPrice_t^{(a)}} \left( \frac{DataUnused_t^{(a)}}{LifeRemaining_t^{(a)}} \right)^{\beta} \quad (8)$$

for some chosen $\beta \geq 0$, where we explicitly show the dependence of $QoE_{t+1}^{(a)}$ on the selected provider a and the application s launched by the user, and $\beta \in \{1, 0\}$ depending on whether or not we want to incentivize the use of a provider when its prepaid plan is close to expiry while its data cap has not been reached.

Alternatively, we may see the existence of the data caps as turning the original contextual 2-armed bandit problem into aCcontextual Bandit with Knapsack problem defined as follows: at each step t, the action a results in the learning algorithm receiving feedback comprising both a reward $R_{t+1}=QoE_{t+1}^{(\alpha)}(s)/PlanPrice_t^{(\alpha)}$ and a (data) consumption vector $(DataUsed_t^{(1)}, DataUsed_t^{(2)})$ for $DataUsed_t^{(i)}=0$ and $i \neq \alpha$, the goal is to maximize the (undiscounted) total reward $$\sum_{t=1}^{T-1} R_{t+1}$$

subject to the budget constraints $$\sum_{t=1}^{T-1} DataUsed_t^{(a)} \leq 1, a = 1, 2,$$

where T is the total number of time steps in the lifetime of the plans. There exist efficient algorithms to solve this convex bandit with knapsack problem that are optimal in a certain sense, but they are more computationally intensive than for the contextual bandit problem.

Extensions to the K-Armed Bandit

We now discuss some extensions and modifications to the basic contextual k-armed bandit previously discussed, and to the RL approach described above.

Contextual UCB bandit. The upper confidence bound (UCB) modification to the contextual k-armed bandit changes the right hand side of (1):

$$A_t(s) = \arg\max_a \left[ Q_t(s, a) + c\sqrt{\frac{\ln t}{N_{t-1}(s, a)}} \right], \quad (9)$$

where c>0 is a fixed constant.

Expanding the context space. Unlike a human user, a user agent residing on the user's device can utilize any attribute or measurement of the network that is available on the device. The obvious candidates to be used by the agent in choosing an action are the SINRs at the device from the k providers at time t, which we denote $SINR_t^{(i)}$, i=1, ..., k, as these SINRs are not only measured by the device but also strongly influence the QoE of most, if not all, apps. Note, however, that we can only attempt to predict the QoE at time step t+1 based on the SINR measurements at time step t. Moreover, the inherent randomness of wireless channels means that the action $A_t=a$ of selecting provider a does not change the distribution of the SINR $SINR_{t+1}^{(i)}$, so the SINRs are part of the context but cannot be part of the state.

Let us return to the (non-contextual) k-armed bandit problem that, as before, is obtained by treating each context (i.e., launched app) completely separately and decoupled from the other contexts. Fix the app to be $s \in \{1, 2, ..., n\}$. This time, however, we shall incorporate the SINRs. We would expect a larger SINR at time step t from provider a to yield a preference on the part of the agent (as it would for a human user) to select the action $A_t(s)=a$. The so-called Gradient Bandit algorithm expresses this preference through the soft-max function yielding the probability distribution over actions given by $$\mathbb{P}\{A_t(s) = a\} = \frac{\exp(H(SINR_t^{(a)}(s)))}{\sum_{i=1}^k \exp(H(SINR_t^{(i)}(s)))} = \pi_t(s, a), \text{ say,} \quad (10)$$

where H(19) is some selected function. This soft-max has a heuristic physical interpretation for wireless channels in the sense that if noise and interference is constant and fades on the link between the nearest base stations of the different providers and the user device are independent and Rayleigh distributed, then the SINRs from the different providers at the user device are independent and Exponentially distributed. If H $(SINR_t^{(i)}(s))$, i=1, ..., k represent the SINR values in dB, then the above soft-max function $\pi_t$ (s, a) is also the probability that $SINR_t^{(\alpha)}(s) = \max_{1 \leq i \leq l} SINR_t^{(i)}(s)$.

The action $A_t(s)$ at time t may be simply drawn from the distribution $\pi_t$ (s, a) or selected as $\arg\max_a \pi_t$ (s, a) or selected as $\arg\max_a \pi_t$ (s, a) with probability $1-\epsilon$ and drawn from the distribution $\pi_t$ (s, a) with probability $\epsilon$ for a chosen small $\epsilon$.

Instead of trying to determine the optimum function $H(\cdot)$ to be used in (10), the Gradient Bandit algorithm simply changes the soft-max in (10) to apply to $H_t^{(i)}$ (instead of H $(SINR_t^{(i)})$, where $H_t^{(1)}, ..., H_t^{(k)}$ are called preference functions, and are updated at each time step as follows:

$$\pi_t(s, a) = \frac{\exp(H_t^{(a)}(s))}{\sum_{i=1}^k \exp(H_t^{(i)}(s))}, a = 1, 2, ..., k, \quad (11)$$

where for each a=1, 2, ..., k $$H_{t+1}^{(a)}(s) = H_t^{(a)}(s) \alpha \delta (R_t - \overline{R_t})[1_{\{a\}}(A_t(s)) - \pi_t(s, \alpha)], \quad (12)$$

where $\delta > 0$ is a step size, and $\overline{R_t}$ is either the arithmetic mean, or an exponentially smoothed average, of $R_1, ..., R_{t-1}$. We may initialize $H_t^{(1)}(s)$, i=1, 2, ..., k to some function of the SINRs.

Extension to the Q-learning direct RL approach. The Q-learning approach described above is a direct maximization of the expected discounted cumulative reward using RL. If the SINRs on the links between the user device and the nearest base stations of the provider networks are known, then they can be incorporated into the action selection through $$A_t = \arg\max_a \overline{q}_*(S_t, a) \pi_t(S_t, a), \quad (13)$$

where $\overline{q}_*(s, \alpha)$ is as described above and $\pi_t$ (s, $\alpha$) is given by (10) with the function $H(\cdot)$ selected as $H(x) = \beta \log x$ for some chosen constant $\beta > 0$. The heuristic reasoning is that the discounted cumulative return $\overline{q}_*(S_t, \alpha)$ is weighted by the probability $\pi_t(S_t, \alpha)$ that the selected provider turns out to be the one with the highest SINR.

Modified reward function to account for budget constraints. The reward function (6) for the fixed-price spectrum market disclosed earlier does not account for a budget constraint that may be imposed by the user on the agent's actions. Of course, a budget constraint may be simply imposed by, say, the payment processing function of the spectrum market, which may refuse to process a bandwidth purchase that leads to the cumulative expenditure by this user exceeding some pre-set limits within a certain pre-set time period. However, such externally imposed curbs on the agent's decisions will not help the agent learn about these constraints, and may lead to disruptions in the user experience if bandwidth is simply made unavailable to the agent. Therefore, it is better to incorporate both near-term and longer-term budget constraints into the reward function, so that the agent is able to learn them. For example, we may modify (6) as follows:

$$R_t = \frac{QoE_{t+1}^{(a)}(s)}{PlanPrice_t^{(a)}} \times$$

max{0, fraction remaining of extended near term budget limit} × max {0, fraction remaining of longer term budget limit}$^\beta$ (14)

where β>1 and the "extended near-term budget limit" is the near-term budget limit multiplied by the factor 1.1, say. This allows the agent to exceed the near-term budget limit (daily or weekly) by up to 10% so long as the longer-term (monthly) budget constraint is met (which is enforced through the exponent β). Note that (14) applies for all agent actions (i.e., bandwidth purchase decisions) that do not breach either the extended near-term limit or the longer-term limit on the budget, for when an agent action would do so, the payment processing function would decline to process the corresponding bandwidth purchase and the reward would therefore be zero.

Alternatively, we may formauate the problem with the (strict) long-term budget constraint (now assumed to hold for bandwidth leases from each provider) as a contextual bandit with knapsack problem where the feeback to the algorithm after action a (defined as a set of bandwidth leases from the various providers) in time step t is the reward $R_{t+1} = QoE_{t+1}^{(\alpha)}(s)/PlanPrice_t^{(\alpha)}$ and the consumption vector $c_t$ whose ith entry equals the amount of money spent on bandwidth lease from provider i. As discussed in Aleksandrs Slivkins, Introduction to multi-armed bandits, Foundation and Trends® in Machine Learning, 12(1-2):1-186, 2019, the optimal policy is a randomized one where the actions are drawn from a joint probability distribution over all providers. The problem can be restated in terms of maximizing the UCB of the expected reward with respect to this optimal probability distribution, subject to the relaxed near-term budget constraint of the lower confidence bound (LCB) of the expected consumption vector with respect to this proability distribution in each time step not exceeding the budget for that time step (for each provider). The LCB requirement allows the consumption vector entry corresponding to a fiven provider in a given time step to exceed the (near-term) budget for that provider for that time step, although the (longer-term) total budget constraint is never relaxed.

Multi-period selections. Bearing in mind the overheads and delays each time a user agent switches providers, it makes sense for the agent to stay with a selected provider for more than a single time step. In this case, the reward function should be the aggregate reward over the individual time steps (with a term to account for the overhead cost of switching), and the action now has to include the selected number of time steps in addition to the selection of the provider.

General Provider Selection Problem as a Restless Bandit

Recall that earlier we assumed that the state transitions on the Markov chains $S_t^{(i)}$ for all provider networks i∈{1, ..., k} other than the selected provider a at time t were paused and only the selected provider's Markov chain $S_t^{(\alpha)}$ made a transition to $S_{t+1}^{(\alpha)}$. This assumption is true for the scenario above because the states are just the apps launched by the human user of the device on which the user agent resides. It even holds for the scenario studied where we assume that all providers hold their prices fixed between two consecutive time steps.

However, if the providers update their prices asynchronously, which may happen if the providers dynamically update their prices in response to user agent activity, for example, then we need to relax the restriction that only the selected provider's Markov chain makes a transition and the other Markov chains do not. The corresponding formulation of the provider selection problem as one of maximizing the expected cumulative discounted reward is called the Restless bandit problem. The restless bandit has been previously studied in communications in the context of dynamic channel selection.

Under certain assumptions, the optimal actions for the restless multi-armed bandit problem are obtained from a set of Whittle indices that are similar to the Gittins indices for the (non-restless) multi-armed bandit. For a system where each provider's state takes only two values, the Whittle indices can be obtained in closed form as shown in Keqin Liu and Qing Zhao, Indexability of restless bandit problems and optimality of whittle index for dynamic multi-channel access, IEEE Transactions on Information Theory, 56(11): 5547-5567, 2010. For richer state spaces, Whittle indices may not even exist, and even if they do, finding them is an open question. As with Duff's use of Q-learning to compute Gittins indices, attempts have been made to apply Q-learning to compute Whittle indices. For large state spaces, Q-learning is realized via deep learning models. However, these deep learning models, because of their higher computational and storage needs, are unsuited for implementation as user agents on mobile devices.

We note in passing that the restless bandit formulation is even applicable to aggregator service providers like GoogleFi if the reward for an individual user is replaced by the total reward to all users served by the aggregator. This formulation also makes clear the fact that the aggregator cannot consider the value of its actions (provider network selection) for any individual user it serves.

The Dual-Speed Restless Bandit Problem

We can model the transition probability matrix in the restless bandit as taking one value when the provider is popular (i.e., selected by more than a minimum number of user agents), and a different value when the provider is unpopular. This corresponds to a situation where there are more frequent price changes for a popular provider (selected by many user agents) than an unpopular one selected by few user agents. The corresponding Bandit problem is called a Dual-Speed Restless Bandit problem.

In fact, we observe that so long as the set of prices charged by the providers is finite, the dual-speed restless bandit problem can describe the general provider selection problem in a spectrum market for bandwidth. Instead of user agents selecting providers, they actually select a provider's offering, which is represented by a block of bandwidth on a certain frequency band on a specific provider's mobile network.

The entry of the state vector corresponding to the launched app on the selected provider's offering changes, while the corresponding entry in all other providers' offerings does not. However, the entries of the state vector corresponding to the prices of all offerings by all providers (whether selected by the user agent or not) also have a state transition.

The probability transition matrix for these price-state transitions, however, can take not one but two values, $P_{pop}$ and $P_{unp}$ corresponding to "popular" and "unpopular" providers' offerings respectively, where popularity is defined as being selected by more than a certain threshold number of user agents, say. We assume that all popular offerings have the same price transition probability matrix $P_{pop}$, and all unpopular offerings have the same price transition probability matrix $P_{unp}$. Suppose there are n possible prices, labeled $\{p_1, \ldots, p_n\}$. A bandwidth offering priced at $p_i$ that drops from the popular to the unpopular category slows down the rate of its price changes by an amount $\epsilon_i < 1$, $i=1, \ldots, n$:

$$P_{unp} = I_{n \times n} - \text{diag}(\in) P_{pop},$$

where $\in = [\epsilon_1, \ldots, \epsilon_n]$.

Like the restless bandit, the dual-speed restless k-armed bandit problem can also be solved using Whittle indices, but the interesting consequence of the dual-speed formulation is that these indices can be computed via the Bertsimas—Niño-Mora algorithm.

Conclusions

We show that the provider selection problem is naturally formulated as a restless multi-armed bandit problem. For a practically relevant and useful scenario, we show that the applicable bandit problem reduces to a contextual multi-armed bandit. We demonstrate via both simulation and experiment that a simple Monte Carlo algorithm for the contextual multi-armed bandit performs well in several scenarios, and also outperforms a direct Reinforcement Learning (Q-learning) approach to maximize the expected cumulative discounted reward.

We have also demonstrated, on a testbed with commercial UEs, the feasibility and benefits of a spectrum bandwidth market allowing UE agents to self-organize onto the providers offering the best QoE, based on an end-user's budget, demand and location at any given time, using standard eSIM technology.

Finally, we note that all these advantages come without compromising the privacy of the user and without central coordination beyond exchange of digital bandwidth contracts. Furthermore, mobile network operators do not need to share any information about their existing users to participate in the market.

Machine Learning of User Preferences for Automated Bandwidth Purchases

We utilize a model wherein bandwidth purchases on a spectrum market are valid for a single allocation epoch and are made at the beginning of that epoch. Each user is assumed to have an agent that makes the appropriate purchase of bandwidth for that user on that allocation epoch, if needed, and without human intervention.

We consider a spectrum market for bandwidth where bandwidth purchases are valid over a defined geographical area. We model the agent as interacting with an environment that is the spectrum market comprising the sellers of bandwidth. The environment has various states and the agent observes the whole or partial state of the environment and takes actions (purchases of bandwidth from selected sellers at the prices quoted by those sellers on the market). After the agent takes an action while the environment is in a certain state, the environment may change state and will also compute a reward that is a measure of the value of this action by the agent.

A successful purchase of bandwidth results in a transaction record that can be translated into mobile network credentials and independently verified both by the consumer and the provider to ultimately connect to and authenticate into the provider network. The transaction record may be implemented as a distributed blockchain and may be linked to a currency exchange with a payment gateway to fund accounts for microtransactions. Identification on the mobile network may thus be linked to the spectrum market identities in the form of PKI verification and key provisioning in eSIMs or USIMs ultimately used to encrypt user traffic on the network. A key point is that service quality in terms of bandwidth sold and consumed may vary and is part of a trust relationship that needs to be learned over time, akin to a reputation system. The consumer is free to switch providers, and providers are allowed to change their prices based on demand.

Local markets can be discovered through the cellular network RF broadcasting channel (e.g. e/gNodeBs), or via geo-searches in cloud or edge databases. In the former case, each provider would broadcast its offers through its e/gNodeBs, and in the latter case, the user may discover all offers in a region directly from a single source. Model location may be represented with hierarchical structures such as geohashes or bounding boxes or based on geographical administrative entities (e.g. city, region, country).

For the scenario described above, the problem of how much bandwidth to purchase, and at what price, in each allocation epoch is posed in the form of Reinforcement Learning.

Reinforcement Learning Framework

First, the agent needs to identify the need for bandwidth as a regular, recurring interaction versus a one-time event. The following proposal is only for the former case.

Since the agent will have recurring interactions with the sellers on the spectrum market over the long term, we propose that the goal of the agent is to maximize its cumulative long-term return, while not exceeding a fixed budget.

We further propose a Reinforcement Learning (RL) framework for this long-term return maximization. We define and explain the various elements of the RL framework below.

State

The state of the environment contains the set of (price, available bandwidth) bundles that are: (i) offered by the sellers on the spectrum market in the next allocation epoch, and (ii) that are visible to the agent. Note that any bandwidth offerings and prices that are broadcast by the e/gNodeBs of an MNO on a band that the user device does not support and cannot scan, are not visible to the agent on that user device, and, from the perspective of that agent, are not present in the market.

We also note here that bandwidth purchases are only valid in a geographical area. We propose that the extent of this geographical area be defined implicitly by the set of broadcast offerings that the user device can receive from the various e/gNodeBs of the MNOs (and other access points). If, during the same allocation epoch, the user moves to a different geographical area where part or all of the purchased bandwidth is already in use, the user will not be able to retain the use of that bandwidth in the new geographical area and will have to repurchase more bandwidth.

In addition to the set of (price, available bandwidth) bundles, the state also contains a geographical location-based identifier of the specific market that these bundles are available on, and another index that represents the allocation epoch on this market.

To summarize, the state may be represented by the following fields:
Market ID (location-based)
Current allocation epoch start time
Current allocation epoch duration
Key-value map with:
  the keys being the seller IDs and
  the value corresponding to each key being a list of tuples of the form (band, air-interface, available bandwidth for sale, price per unit of bandwidth), where:
    the "band" refers to, say, "5 GHz" or "3.5 GHz" etc.,
    the "air-interface" is "WiFi" or "LTE" or "5G", etc.,
    the "available bandwidth" is an integer representing some number of units of bandwidth (where the units have been fixed by agreement to be, say, 100 kHz or 1 MHz), and
    the "price per unit of bandwidth" is also in units of some currency (e.g., the "Spectrum Exchange Token" with some published rate of exchange of these tokens for US dollars, say).

Action

The action taken by the agent in a given allocation epoch is the purchase of a certain number of units of bandwidth from a selected seller at a given price, in a specific location. Thus, the action may be represented by the following fields:
Market ID
Allocation epoch wherein the purchased bandwidth may be used: start time
Allocation epoch wherein the purchased bandwidth may be used: duration
Key-value map with:
  The keys being the IDs of the sellers from whom the bandwidth is purchased, and
  The value corresponding to each key being a list of tuples of the form (band, air-interface, purchased bandwidth, price paid per unit of bandwidth), where:
    The "band" refers to, say, "5 GHz" or "3.5 GHz" etc.,
    The "air-interface" is "WiFi" or "LTE" or "5G", etc.,
    The "purchased bandwidth" is an integer representing some number of units of bandwidth (where the units have been fixed by agreement to be, say, 100 kHz or 1 MHz), and
    The "price paid per unit of bandwidth" is in units of some currency (e.g., the "Spectrum Exchange Token" with some published rate of exchange of these tokens for US dollar, say).

Reward

The reward from this action taken in this state is in general a function of:
  The purchased bandwidth The need for this bandwidth (this is dependent upon the bandwidth demand of the application the user expects to run, and how important to the user it is for this application to get its demanded bandwidth—for example, an important business teleconference has both high bandwidth demand and high importance to the user)
  The user experience on this bandwidth (e.g., if this bandwidth is strongly affected by interference, then the actual user experience is significantly worse than what the user would expect)
  The price paid to purchase this bandwidth
  The user's budget for this bandwidth purchase.

B.A. Huberman and S. Asur, "BidPacket: trading bandwidth in public spaces," Netnomics, vol. 17, pp. 223-232, 2016 gives the following example expression for the utility for a given user in resource allocation epoch t upon purchase of bandwidth $B_t$ at price $p_t$ when its need for this bandwidth is $b_t$ and its budget is $w_t$:

$$U_t = b_t B_t - \frac{p_t}{2w_t} B_t^2$$

This expression accounts for all the factors listed above except the user experience on the purchased bandwidth. If the experience is measured by the throughput $T_t$ on that bandwidth over the next allocation epoch, then the reward could be defined as $$R_t = b_t T_t - \frac{p_t}{2w_t} T_t^2$$

where, for example, the throughput is related to bandwidth as follows:

$$T_t(B_t) = B_t \log_2(1 + \overline{SINR}_t) \text{ bits/s},$$

where $\overline{SINR}_t$ is the average Signal to Interference plus Noise Ratio during the allocation epoch.

An alternative definition of reward can be used if the user experience on the purchased bandwidth is measured not by the throughput but by the latency.

Statement of the RL Problem

We measure "time" as the discrete index of the allocation epochs, starting from some time t, say, when the environment is in some initial state $S_t = s$, say. Suppose the agent now takes action $A_t = \alpha$. This action corresponds to the purchase of some number $B_t$ of units of bandwidth at a certain price $p_t$ (per unit of bandwidth) from a particular seller.

As a result of the bandwidth purchase (action), we assume that the user instantly has access to the purchased bandwidth for its transmissions. Immediately after the action, the time index changes from t to t+1. Suppose that the environment changes state to $S_{t+1} = s'$ and computes a reward of $R_{t+1}$ given by a reward function such as the one defined above.

We are interested in the accumulated reward, also called the return, over all times starting from t. If the sequence of rewards at times t+1, t+2, . . . are denoted $R_{t+1}$, $R_{t+2}$, respectively, then it is common to define a discount factor $\gamma$ such that $0 < \gamma < 1$ and define the discounted return $$G_t = \sum_{k=0}^{\infty} \gamma^k R_{t+k+1}$$

Finding the Optimum Bandwidth Purchase Policy

We will focus on the expected discounted return from time t onward, conditioned on the initial state at time t being $S_t=s$ and the initial action at time t being $A_t=\alpha$, with all subsequent actions drawn from the policy, which yields the action to be taken in any state, and is in general randomized and described by the (stationary) conditional probability distribution $$\pi(\alpha|s) \overset{\text{def}}{=} P\{A_{t+k+1}=\alpha|S_{t+k+1}=s\} \text{ for all } k.$$

The expected discounted return if we apply action a in the initial state s and thereafter follow policy $\pi(\cdot|\cdot)$ is called the action-value function for policy $\pi(\cdot|\cdot)$ and denoted $$q_\pi(s, a) = E[G_t \mid S_t = s, A_t = a] = E\left[\sum_{k=0}^{\infty} \gamma^k R_{t+k+1} \mid S_t = s, A_t = a\right]$$

Our goal is to maximize this expected discounted return by choosing a policy so as to obtain $$q_*(s, a) = \max_{\pi(\cdot|\cdot)} q_\pi(s, a)$$

The theory of dynamic programming says that the maximum of the action-value function is obtained recursively by solving the Bellman optimality equation $$q_*(s, a) = E\left[R_{t+1} + \gamma \max_{a'} q_*(S_{t+1}, a') \mid S_t = s, A_t = a\right]$$

and the optimum policy is a deterministic one: the action to be taken in state s is $$a = \underset{a'}{\operatorname{argmax}} q_*(s, a')$$

Note that the action corresponds to a purchase of a certain number of units of bandwidth at a certain price. The above problem formulation does not impose the constraints that: (i) the total cost of the purchased bandwidth cannot exceed the available budget of that user, and (ii) the purchased bandwidth from any seller cannot exceed the bandwidth available for purchase from that seller. Thus the action obtained from the above equation may need to be modified to conform to these constraints. For example, if the user's budget cannot accommodate the purchase of the amount of bandwidth that the policy recommends, then it may just purchase as much bandwidth as possible given the available budget.

Applying Reinforcement Learning to the Bandwidth Purchase Problem

The agent runs all the time on the user device and has the following two components:

1. A machine learning model ("model 1") that learns the user's app-usage habits, which for brevity we shall call the user profile. The output of this machine learning model at the start of each allocation epoch is the predicted bandwidth demand (by this user), and the need for that bandwidth by the user, for that allocation epoch. For example, if the user is a salesman who does a video conference call with a major client every weekday at 8:00 am, and the allocation epoch starts at 8:00 am and runs through 9:00 am, the output of this machine learning model every weekday at 8:00 am should be the bandwidth demanded by the video conference application for the next hour, as well as the need (or urgency) of this bandwidth demand (which is high in this particular example). As an example, the predicted need for the demanded bandwidth may be one of just three values, corresponding to "not urgent", "urgent" and "critical." The predicted demanded bandwidth may be in multiples of some fixed unit of bandwidth, say 1 MHz, so that a predicted demand of 10 means that 10 MHz of bandwidth are demanded. Further, this model also predicts the maximum amount $w_t$ of the agent's total wealth that will be budgeted toward bandwidth purchases in the next allocation epoch. This amount will be expressed in multiples of some fixed unit of currency (the "Spectrum Exchange token").

2. Another machine learning model ("model 2") that implements the policy for the next allocation epoch, i.e., outputs an action when the input to the model is the present state of the environment, and the predicted bandwidth demand and need for bandwidth from the first machine learning model described above. Recall that the state is the collection of price and available bandwidth bundles from the sellers on the spectrum marketplace. The action to be taken by the agent is the purchase of a certain number of units of bandwidth at a certain price (or prices) from one or more sellers. The purchase policy is decided by the value-action function maximization problem described in the previous section. While the purchased total bandwidth should be sufficient to meet the predicted demand for that allocation epoch, this cannot be guaranteed by the action recommended by the purchase policy, for the reasons noted previously.

Figure 10:
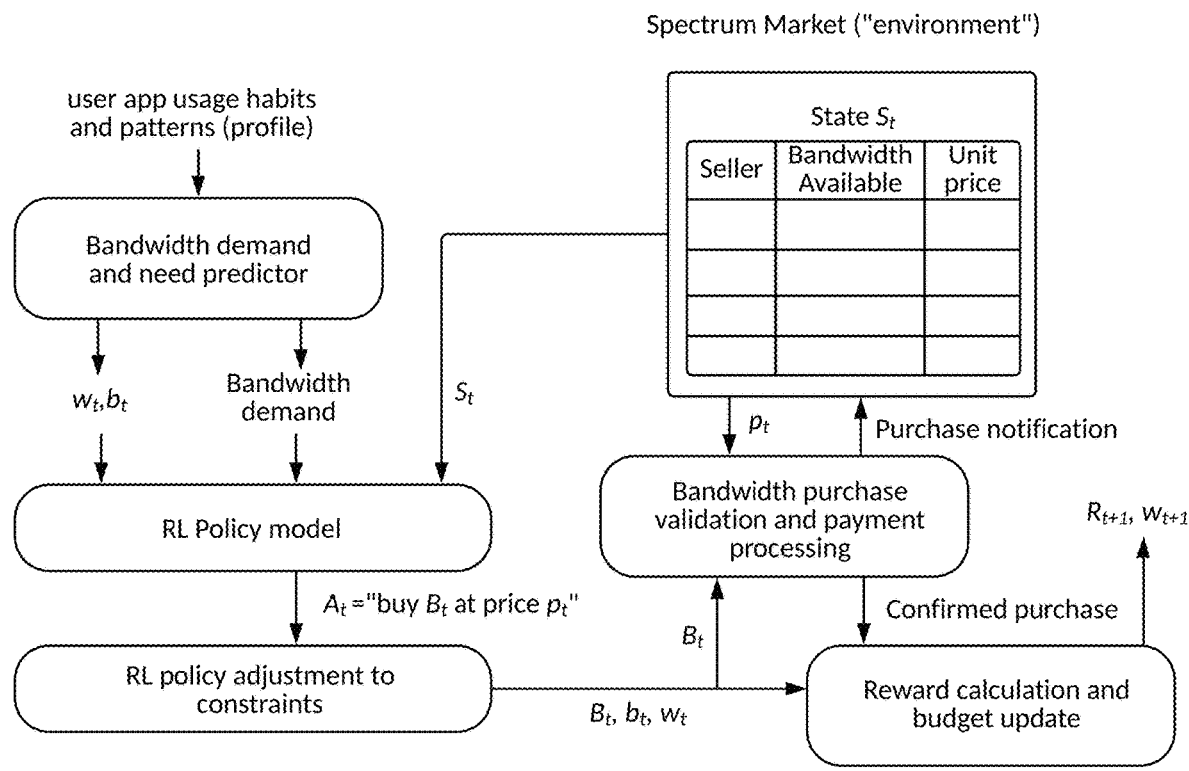
FIG. 10 is a block diagram of a proposed machine-learning enabled bandwidth purchasing agent for a given user, and its interactions with a spectrum market, according to an embodiment.

A block diagram of the agent and its interactions with the spectrum market is shown in FIG. 10.

The Process of Purchasing Bandwidth on the Spectrum Market

From the above discussion, the process of an agent purchasing bandwidth on the spectrum market for the next allocation epoch takes place according to the following sequence of steps.

1. Agent either scans e/gNodeBs and access points for their broadcasts of available bandwidth offerings, or accesses a well-known URL to collect information on the available (price, bandwidth) bundles from the various sellers in that geographical location 2. Agent's ML model 1 estimates the following three quantities:
    Budget $w_t$ for bandwidth purchases in the next allocation epoch (in units of a selected currency such as "Spectrum Exchange tokens");
    Bandwidth demanded by the user in the next allocation epoch (in units of a fixed pre-selected amount, such as 100 kHz or 1 MHz);
    The need $b_r$ for the demanded bandwidth, which is a fraction between 0 and 1.

3. Agent's ML model 2 takes in the outputs of ML model 1 and the state, and computes an action given by the maximizer of the action-value function.

4. The bandwidth purchase recommended as the "action" to be taken by the agent's ML model 2 is then adjusted if necessary in order to satisfy the constraints on: (i) bandwidth demand; and (ii) budget for bandwidth purchases. Note that it is possible to make purchases from more than one vendor and aggregate all the purchased bandwidth, but such aggregation across possible multiple bands is complicated. Another strategy which is suboptimal but simpler to implement is to restrict bandwidth purchases to a single seller in any allocation epoch.

5. The agent communicates the final bandwidth purchase amount to the market operator so that the appropriate seller can be credited the amount for the bandwidth purchase and the purchase can be authenticated and the purchased bandwidth can be publicly flagged as belonging to this user in the next allocation epoch.
6. The total wealth/budget of the user is now decremented by the amount of the purchase. If the total budget drops below some threshold (learned or set in the user's profile), the user may be prompted to "top up" the budget, or this may be automatically done if the user has authorized it by linking a bank account or credit card number.
7. The state of the environment, i.e., the set of available (price, bandwidth) bundles is also updated and becomes the state at the start of the next allocation epoch.
8. At the start of the next allocation epoch, any bandwidth from the previous allocation epoch is relinquished by the user and the user now exclusively transmits and receives on the newly-purchased bandwidth.
9. Throughout the allocation epoch, the user measures its quality of experience through the SINR or comparable measures.
10. At the end of the allocation epoch, the user reports its SINR to the market operator and the market operator computes the reward for that user in the just-concluded allocation epoch.

Solving for the Value-Action Function Maximizer using Machine Learning

Recall that the space of actions $A_{t+k}$, k=0,1, . . . is discrete, and the space of states $S_{t+k}$, k=0,1, . . . is also discrete. Thus the function $q_*(\cdot,\cdot)$ is equivalent to a table. The Deep Q-Learning approach to solving the Bellman optimality equation is to represent $q_*(\cdot,\cdot)$ by a feedforward neural network model $Q(\cdot,\cdot,w)$, where w is the set of all parameters (connection weights and connection biases for the nodes in the various layers of the neural network). One way to train this neural network model is using the "Deep Q-Network" or DQN methodology, as follows:

Freeze the parameters at $w^-$ and keep them fixed over several rounds of gradient descent updates to the parameters. Periodically, the frozen targets are updated with the newer parameters: $w^- \leftarrow w$.

Start at some randomly chosen initial state.

If at time t, the state is $s_t$, take action $\alpha_t$ according to an ε-greedy policy: i.e., with probability 1−ε for some small positive E (typically between 0.01 and 0.05), $\alpha_t$ is chosen as $$\underset{a}{\mathrm{argmax}} Q(s_t, a, w^-),$$

while with probability ε, $\alpha_t$ is drawn at random (with equal probability) from amongst all actions that are possible in the action space.

At time t+1, store the observed transition tuple $(s_t, \pi_t, r_{t+1}, s_{t+1})$ in dedicated storage called replay memory. This replay memory may contain such tuples from other sessions with other agents as well.

Train as you proceed with the present session: sample a mini-batch M say, of transition tuples (s, α, r, s') from the replay memory and use them to perform the stochastic gradient descent update on the objective function L(w) defined by the mean-squared error between the present Q-function value Q(s, a, w) and the learning target $$r + \gamma \underset{a'}{\max} Q(s', a', w^-):$$

$$\mathcal{L}(w) = \frac{1}{|\mathcal{M}|} \sum_{(s,a,r,s') \in \mathcal{M}} \left[ r + \gamma \underset{a'}{\max} Q(s', a', w^-) - Q(s, a, w) \right]^2.$$

The gradient of this function (for gradient update) is taken with respect to w only and not $w^-$, which is assumed fixed.

Revealing Hidden Preferences of Users via the Pricing Mechanism

In order for agents not to ask to purchase more bandwidth than they actually require for their bandwidth demand in a given allocation epoch, it is necessary for the agent's ML model 1 to output truthful values of the need $b_t$ for bandwidth. As long as the user's budget can support it, it is in the interest of this ML model 1 to overstate the need/urgency of its bandwidth demand.

The process of bandwidth purchase generally assumes that the reported need for bandwidth is truthful. However, the market pricing mechanism can be employed to reveal the "true" need for bandwidth through an options mechanism and at the cost of a delay in purchase, as follows:

Two allocation epochs before the epoch t when the agent's ML model 1 anticipates its need for bandwidth, this model 1 submits its predicted need $\tilde{b}_t$ to the agent's ML model 2. Steps 2 and 3 take place but we do not proceed to Step 4 or Step 5. Instead, the market operator and the seller of spectrum are merely notified of this upcoming purchase of bandwidth $\tilde{B}_t$ as calculated in Step 3, without actually confirming the purchase or transferring currency from the user's account to that of the seller. However, the user pays a relatively modest "option" price given by some function $g(\tilde{b}_t)$ to the seller, where $g(\cdot)$ is a monotone decreasing function, e.g., linearly decreasing.

In the allocation epoch before the epoch t when the user actually uses the purchased bandwidth, we go through the remainder of the steps starting with Step 4, which adjusts the potential purchased bandwidth $\tilde{B}_t$ to the actual purchased bandwidth $B_t$. The only change is that in Step 5, the user pays an additional "option usage" fee given by some function $f(\tilde{b}_t)$ to the seller, where $f(\cdot)$ is a monotone increasing function which increases faster than $g(\cdot)$ decreases, e.g., $f(\cdot)$ could be quadratically increasing.

On average, the "truthful" need for bandwidth is $b_t = B_t/\tilde{B}_t$ and may be considered the probability that the nominally requested bandwidth will really be purchased and used. It follows that on average, the user pays $g(\tilde{b}_t) + b_t f(\tilde{b}_t)$ as the fee for "reserving" resources as per its initial expressed need $\tilde{b}_t$. Since $f(\cdot)$ increases faster than $g(\cdot)$ decreases, it can be shown that the user minimizes its fees if it truthfully declares its initial need $\tilde{b}_t$ to be the actual need $b_t$.

These options may be executed by a 3$^{rd}$ party aggregator service, which has statistics on bandwidth purchases and prices for a group of users.

Cold Start Initialization, Seeding Model 2, and Collaborative Training of Model 2

The majority of this analysis has been for a single agent on a single user, not interacting with any other agents.

However, it is possible to conceive of all users that are subscribers of a service provider, say an MSO, collaborating to train a baseline high-performance ML model 2 that is then customized for each user's usage pattern and requirements by that user's agent. This is especially useful for RL training algorithms, which are slow to converge, and would pose a "cold start" problem for a new user on the spectrum market (see below).

In particular, Federated Learning (FL) is an attractive way to achieve collaborative training of a common ML model 2 without needing to exchange training data between the agents that are collectively training this common model. A natural fit for FL training in reinforcement learning is the so-called asynchronous advantage actor-critic or A3C model. However, it must be noted that A3C is an on-policy learning algorithm, which means that it can only be trained on session traces of the same policy, and cannot exploit session traces collected from other policies in the way DQN can.

A benefit of having such a collaboratively trained agent ML model 2 is that a user who is a new subscriber to this service provider, or new to this particular spectrum market (maybe because it traveled from a different geographical region served by a different spectrum market), can be immediately seeded with this baseline model 2 by the service provider, without requiring the user to run a lengthy RL algorithm to train the agent model. It is even conceivable that the spectrum market operator (the spectrum exchange) maintains such a baseline model and offers it to new customers (users) on the spectrum market.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. An agent for autonomously controlling mobile network access, the agent comprising:
   an activity monitor, located on a user equipment (UE), that identifies an application accessed by a user; and
   a selector, located on the UE, that:
   (i) receives information from the activity monitor;
   (ii) determines resource requirements of the application;

(iii) identifies a plurality of resource packages;
(iv) predicts which one resource package of the plurality of resource packages meets the resource requirements and optimizes a reward function using a machine learning model trained on previously implemented resource packages and associated quality of experience (QoE) metrics; and
(v) instructs a component of the UE to implement the one resource package.

2. The agent of claim 1, wherein each of the plurality of resource packages provides at least a mobile network service provider, a resource quantity, and a price.

3. The agent of claim 2, wherein the resource quantity is selected from a bandwidth allocation, pre-purchased data minutes, pre-purchased voice minutes, and a data capacity limit.

4. The agent of claim 1, wherein each of the plurality of resource packages further provides one or more of an epoch, an expiration date, a geographic indicator, a roaming indicator, a frequency band indicator, and an air-interface indicator.

5. The agent of claim 1, wherein the resource requirements of the application comprise one or more of a type of resource, a bandwidth requirement, and a priority designation.

6. The agent of claim 1, wherein identifying a plurality of resource packages comprises monitoring RF broadcasting channels, querying a resource database on the UE, geo-searching a cloud or edge resource database, querying a nearby base station, or querying a bandwidth clearing house.

7. The agent of claim 1, wherein the QoE metric is at least partially based on throughput, latency, dropped frames, upload rate, and/or SINR.

8. The agent of claim 1, wherein implementing the selected resource package comprises activating one of a plurality of mobile network service profiles on the UE, and/or purchasing spectrum bandwidth.

9. The agent of claim 8, wherein the mobile network service profiles are software-based, stored on physical medium, or a combination thereof.

10. The agent of claim 8, wherein the plurality of mobile network service profiles comprises one or more physical SIM cards, embedded subscriber identity modules (eSIMs), and/or embedded universal integrated circuit cards (eUICCs).

11. The agent of claim 1 further comprising a user profile comprising user preferences gathered from human input and/or machine learning.

* * * * *